(12) United States Patent
Choi et al.

(10) Patent No.: US 12,323,758 B2
(45) Date of Patent: Jun. 3, 2025

(54) ELECTRONIC DEVICE FOR AUDIO, AND METHOD FOR MANAGING POWER IN ELECTRONIC DEVICE FOR AUDIO

(71) Applicant: SAMSUNG ELECTRONICS CO., LTD., Suwon-si (KR)

(72) Inventors: Jaejoon Choi, Suwon-si (KR); Donghyeon Kim, Suwon-si (KR); Sanghyeok Sim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 17/899,897

(22) Filed: Aug. 31, 2022

(65) Prior Publication Data

US 2022/0417645 A1  Dec. 29, 2022

Related U.S. Application Data

(63) Continuation of application No. PCT/KR2021/001624, filed on Feb. 8, 2021.

(30) Foreign Application Priority Data

Mar. 17, 2020  (KR) .................. 10-2020-0032868

(51) Int. Cl.
*H04R 1/10* (2006.01)
*G06F 3/16* (2006.01)
(Continued)

(52) U.S. Cl.
CPC .......... *H04R 1/1041* (2013.01); *G06F 3/165* (2013.01); *H04W 76/15* (2018.02); *H04W 76/25* (2018.02);
(Continued)

(58) Field of Classification Search
CPC .............. H04R 1/1041; H04R 2420/05; H04R 2420/07; H04R 2460/03; H04R 1/1091;
(Continued)

(56) References Cited

U.S. PATENT DOCUMENTS 10,397,688 B2 * 8/2019 Hirsch ................ H02J 7/0044
10,631,363 B1 * 4/2020 Xian .................. H04M 1/6066
(Continued)

FOREIGN PATENT DOCUMENTS

KR  10-2016-0075060  6/2016
KR  10-2017-0067050  6/2017
(Continued)

OTHER PUBLICATIONS

International Search Report for PCT/KR2021/001624 mailed May 14, 2021, 5 pages.
(Continued)

*Primary Examiner* — Oyesola C Ojo
(74) *Attorney, Agent, or Firm* — NIXON & VANDERHYE P.C.

(57) ABSTRACT

An electronic device may include: a communication circuit; and a processor operatively connected to the communication circuit. The processor may be configured to generate a communication link to a first electronic device for audio by using the communication circuit, and when identifying a first state in which the remaining battery capacity of the electronic device for audio is smaller than the remaining battery capacity of the first electronic device for audio, and a difference between the remaining battery capacity of the electronic device for audio and the remaining battery capacity of the first electronic device for audio is greater than or equal to a threshold value, change a master role from the electronic device for audio to the first electronic device for audio. Various other embodiments may be provided.

13 Claims, 11 Drawing Sheets

(51) Int. Cl.
  *H04W 76/15* (2018.01)
  *H04W 76/25* (2018.01)
(52) U.S. Cl.
  CPC ...... *H04R 2420/05* (2013.01); *H04R 2420/07* (2013.01); *H04R 2460/03* (2013.01)
(58) Field of Classification Search
  CPC ........ H04R 5/04; H04R 1/1025; H04R 5/033; G06F 3/165; H04W 76/15; H04W 76/25; H04M 1/72454; H04M 1/6066; Y02D 30/70
  See application file for complete search history.

(56) References Cited

U.S. PATENT DOCUMENTS

| | | |
|---|---|---|
| 2009/0197532 A1 | 8/2009 | Wyper |
| 2011/0033073 A1 | 2/2011 | Inoshita et al. |
| 2016/0150465 A1* | 5/2016 | Jung ................. H04W 52/0209 370/254 |
| 2016/0157026 A1* | 6/2016 | Guindi ................. H04R 25/552 381/60 |
| 2016/0183009 A1 | 6/2016 | Kim et al. |
| 2016/0219358 A1* | 7/2016 | Shaffer ................. H04R 1/1016 |
| 2017/0164089 A1 | 6/2017 | Lee et al. |
| 2017/0264987 A1* | 9/2017 | Hong ................... H04R 1/1091 |
| 2017/0311105 A1 | 10/2017 | Hariharan et al. |
| 2018/0199282 A1* | 7/2018 | Newham ............ H04W 52/0206 |
| 2018/0338197 A1* | 11/2018 | Jeong ................... H04R 1/1033 |
| 2019/0182765 A1 | 6/2019 | Newham |
| 2019/0200113 A1 | 6/2019 | Kim et al. |
| 2020/0007977 A1* | 1/2020 | Gong .................... H04R 29/001 |
| 2020/0007989 A1* | 1/2020 | Gong .................... H04R 1/1041 |
| 2020/0008124 A1* | 1/2020 | Gong .................... H04W 40/005 |
| 2020/0053612 A1* | 2/2020 | Jorgovanovic .... H04M 1/72412 |
| 2020/0196372 A1* | 6/2020 | Ouyang .................... H04R 5/04 |

FOREIGN PATENT DOCUMENTS

| | | | |
|---|---|---|---|
| KR | 10-2017-0105795 | 9/2017 | |
| KR | 10-2019-0078949 | 7/2019 | |
| WO | WO 015/018456 A1 | 2/2015 | |
| WO | WO-2015018456 A1 * | 2/2015 | ........... H04R 25/305 |

OTHER PUBLICATIONS

Written Opinion of the ISA for PCT/KR2021/001624 mailed May 14, 2021, 4 pages.
Korean Office Action dated Feb. 20, 2024 for KR Application No.
Extended European Search Report dated Jun. 7, 2023 for EP Application No. 21771802.2.
Office Action for EP Application No. 21771802.2 dated Mar. 25, 2025, 7 pages.

* cited by examiner

ELECTRONIC DEVICE FOR AUDIO, AND METHOD FOR MANAGING POWER IN ELECTRONIC DEVICE FOR AUDIO

CROSS REFERENCE TO RELATED APPLICATION

This application is a continuation of International Application No. PCT/KR2021/001624 designating the United States, filed on Feb. 8, 2021 in the Korean Intellectual Property Receiving Office and claiming priority to Korean Patent Application No. 10-2020-0032868, filed on Mar. 17, 2020, the disclosures of which are all hereby incorporated herein by reference for all purposes as if fully set forth herein.

TECHNICAL FIELD

Various example embodiments relate to an electronic device for audio and/or a method for managing power in an electronic device for audio, wherein power of a pair of electronic devices for audio can be managed.

BACKGROUND

In line with recent development of digital technologies, there has been widespread use of various types of electronic devices such as a mobile communication terminal, a smartphone, a tablet personal computer, a personal digital assistant (PDA), an electronic scheduler, a notebook, a wearable device, an Internet of thing (IoT) device, and an audible device.

An electronic device may connect to various kinds of auditory devices (for example, an audio output device, such as a wired headphone, a wired earphone, a wireless headphone, or a wireless earphone). The electronic device may output played audio data (for example, sound source) through the connected auditory device, and the user may hear audio data from the electronic device through the auditory device. The electronic device and the auditory device may be connected through a wired interface (for example, connector connection) or wireless interface (for example, Bluetooth connection).

In the case of wireless earphones operating as a pair among auditory devices, the same may include a first earpiece and a second earpiece worn on the user's both ears, respectively, and each of the first and second earpieces may include an independent power supply.

There may be a difference in the amount of battery usage between the first and second earpieces because respective earpieces consume different amounts of power depending on the assigned roles. The first and second earpieces may have different operation/usage times.

The quality of audio data may be degraded (discontinuous audio data) if the role of each earpiece is changed with no condition, depending on the difference in the amount of battery usage.

SUMMARY

Various embodiments relate to an electronic device for audio and/or a method for managing power in an electronic device for audio, wherein power of a pair of electronic devices for audio can be managed.

According to various embodiments, an electronic device for audio may include a communication circuit and a processor operatively connected to (directly or indirectly) the communication circuit, wherein the processor is configured to generate a communication link with a first electronic device for audio by using the communication circuit, and change a master role from the electronic device for audio to the first electronic device for audio when identifying a first state in which the remaining battery capacity of the electronic device for audio is smaller than the remaining battery capacity of the first electronic device for audio, and a difference between the remaining battery capacity of the electronic device for audio and the remaining battery capacity of the first electronic device for audio is greater than or equal to a threshold value.

According to various embodiments, a power management method for an electronic device for audio may include generating a communication link with a first electronic device for audio by using a communication circuit, calculating a difference between a remaining battery capacity of the electronic device for audio and a remaining battery capacity of the first electronic device for audio when the remaining battery capacity of the electronic device for audio is smaller than the remaining battery capacity of the first electronic device for audio, and changing a master role from the electronic device for audio to the first electronic device for audio when identifying the difference between the remaining battery capacity of the electronic device for audio and the remaining battery capacity of the first electronic device for audio is greater than or equal to a threshold value.

According to various embodiments, power of a pair of electronic devices for audio may be managed in a balanced manner by reducing the difference in the amount of battery usage of the pair of electronic devices for audio.

According to various embodiments, roles of a pair of electronic devices for audio may be efficiently changed with each other such that audio data does not become discontinuous.

BRIEF DESCRIPTION OF DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
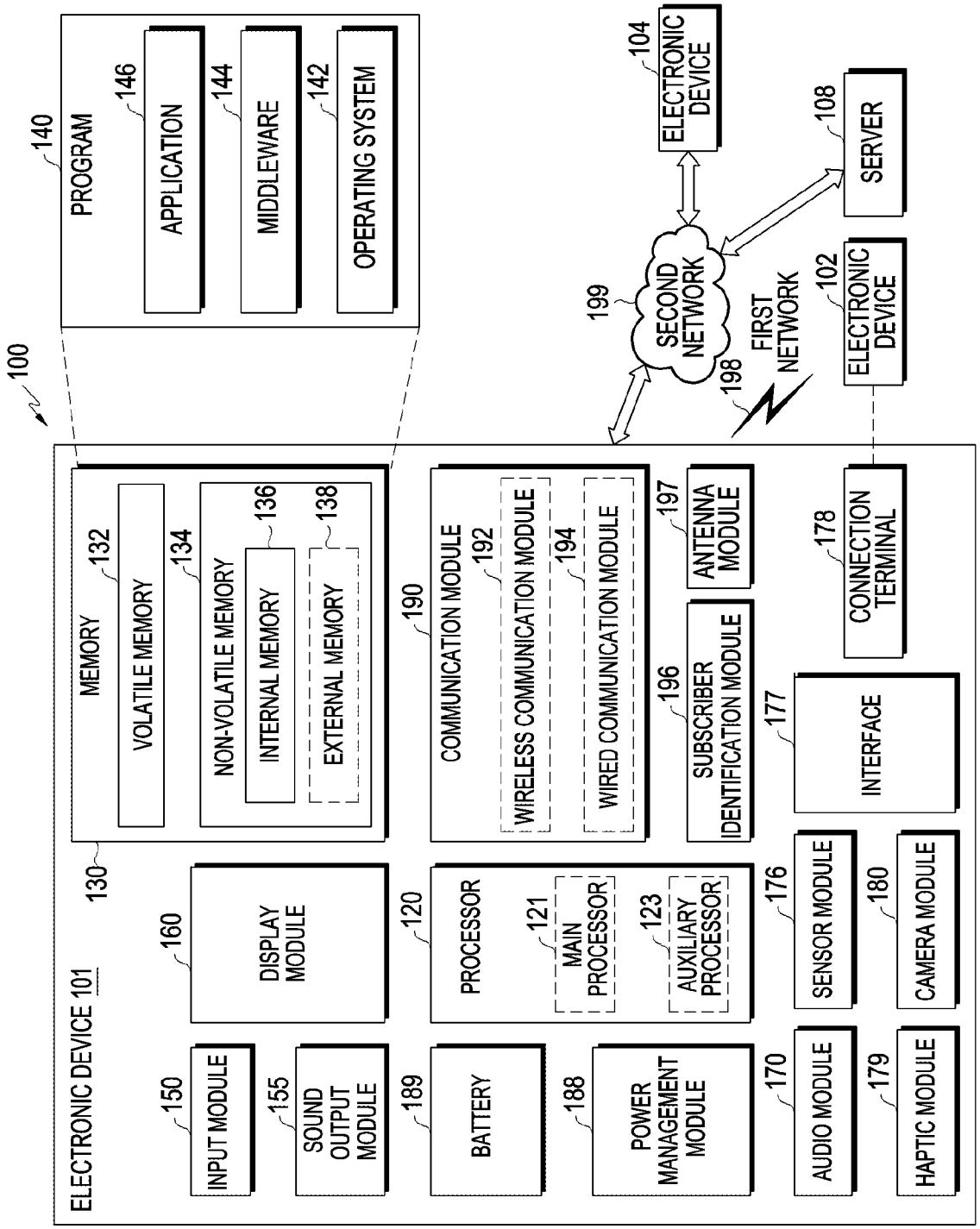
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
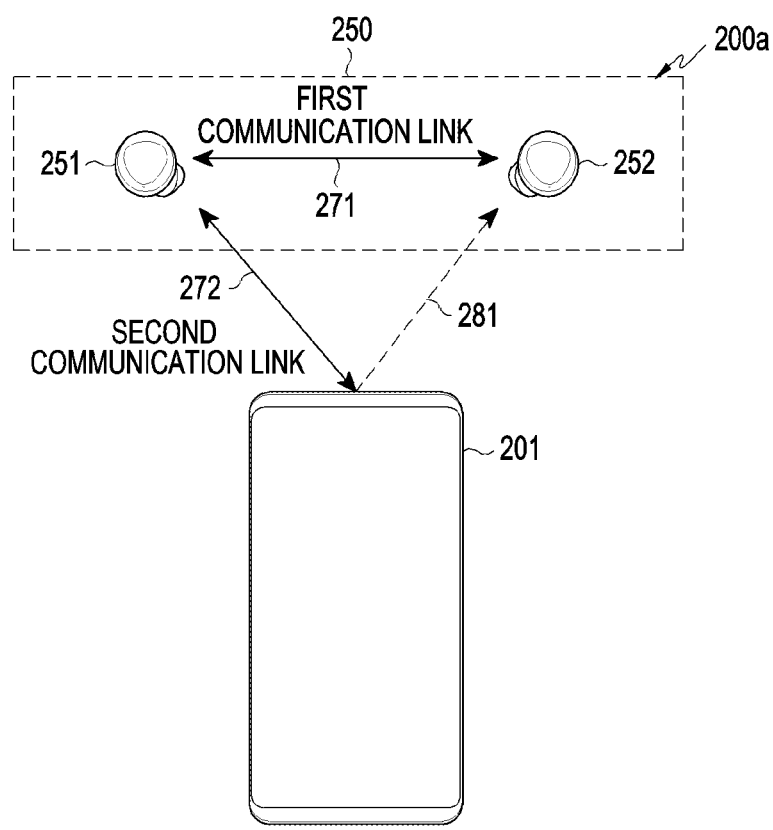
FIG. 2A is a diagram illustrating a power management operation in a state in which a communication link between an electronic device for audio and an electronic device is generated according to various example embodiments.
Figure 2B:
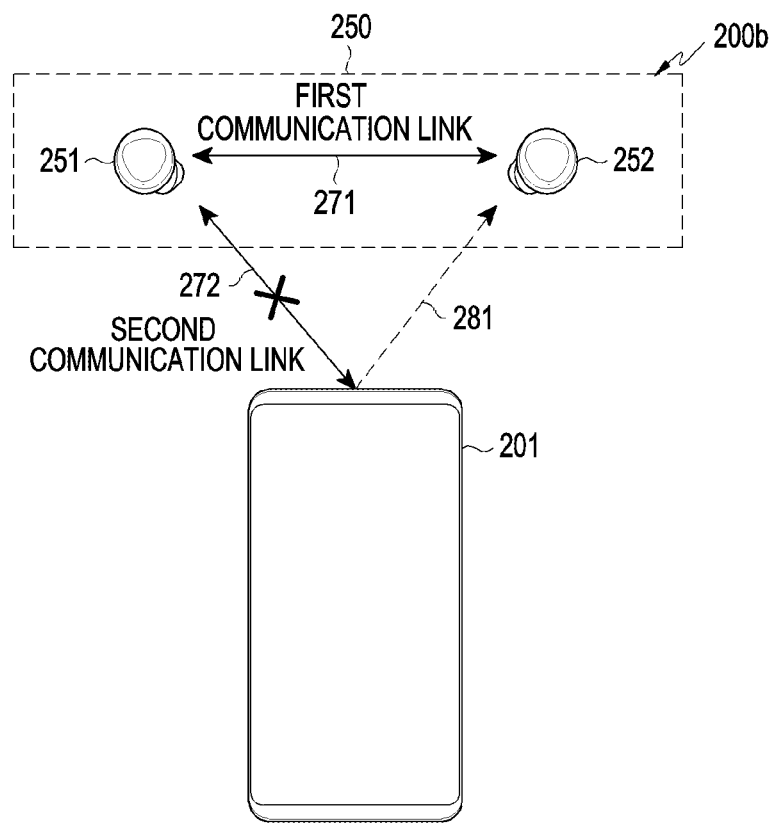
FIG. 2B is a diagram illustrating a power management operation in a standby state before a communication link between an electronic device for audio and an electronic device is generated according to various example embodiments.
Figure 2C:
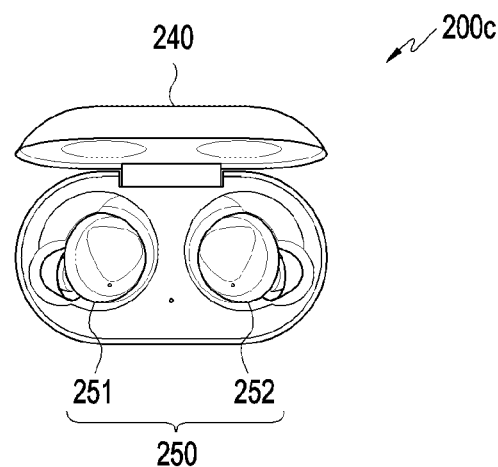
FIG. 2C is a diagram illustrating a power management operation in a state in which a communication link between an electronic device for audio and an electronic device is released according to various example embodiments.

FIG. 2A is a diagram 200a illustrating a power management operation in a state in which a communication link between an electronic device for audio and an electronic device is generated according to various embodiments. FIG. 2B is a diagram 200b illustrating a power management operation in a standby state before a communication link between an electronic device for audio and an electronic device is generated according to various embodiments. FIG. 2C is a diagram 200c illustrating a power management operation in a state in which a communication link between an electronic device for audio and an electronic device is released according to various Referring to FIG. 2A, according to various embodiments, electronic devices for audio 250 operating as a pair may include a first electronic device for audio 251 and a second electronic device for audio 252.

According to various embodiments, the first electronic device for audio 251 be determined as a master role.

According to various embodiments, the first electronic device for audio 251 generate a first communication link 271 with the second electronic device for audio and may be determined as a master role in a connection process for generating the first communication link with the second electronic device for audio 252.

According to an embodiment, the first electronic device for audio 251 may generate the first communication link with the second electronic device for audio 252 based on Bluetooth communication (e.g., Bluetooth low energy (BLE)

According to an embodiment, the first electronic device for audio 251 may generate a second communication link with an electronic device 201 (e.g., the device 101 of FIG. 1) based on Bluetooth communication (e.g., Bluetooth low energy (BLE) communication and/or Bluetooth legacy communication).

According to an embodiment, the first electronic device for audio 251 may transmit sink information, packet information that the second electronic device for 252 has not received from the electronic device 201, and/or connection information at least one of address information of the electronic device, clock information, channel information, service discovery protocol (SDP) result information, supported feature, manufacture data, or key information (e.g., link key)) on the second communication generated between the first electronic device for audio 251 for audio and the electronic device 201 to the second electronic device for audio 252 to which the first communication link 271 is configured.

According to an embodiment, the first electronic device for audio 251 may receive audio data and transmit data related to whether the audio data is received by using the second communication link generated with the electronic device 201.

According to various embodiments, the first electronic device for audio 251 may change the master role from the first electronic device for audio 251 to the second electronic device for audio 252 based on a difference between first remaining battery capacity of the first electronic device for audio 251 and second remaining battery capacity of the second electronic device for audio 252.

According to various embodiments, the first electronic device for audio 251 may transfer the master role of the first electronic device for audio 251 to the second electronic device for audio 252 to swap the roles of each other when it is identified that a first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to a threshold value.

According to an embodiment, when the first state is identified, the first electronic device for audio 251 may identify the elapse of a predetermined time to identify that the first state is maintained for a predetermined time, and may transfer the master role of the first electronic device for audio 251 to the second electronic device for audio 252 to swap the roles of each other.

For example, in a case where the first remaining battery capacity of the first electronic device for audio 251 is 70% and the second remaining battery capacity of the second electronic device for audio 252 is 76%, the first electronic device for audio 251 may identify as the first state if the first remaining battery capacity (70%) is smaller than the second remaining battery capacity (76%) and the difference (6%) between the first remaining battery capacity (70%) and the second remaining battery capacity (76%) is greater than or equal to a threshold value 5%, and may change the master role from the first electronic device for audio 251 to the second electronic device for audio 252 after a predetermined time has elapsed.

According to various embodiments, the first electronic device for audio 251 may transfer the master role of the first electronic device for audio 251 to the second electronic device for audio 252 to swap the roles of each other when it is identified that the buffer level received from the electronic device 201 in which the second communication link is generated is greater than or equal to the threshold level in the first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to the threshold value.

According to an embodiment, when it is identified that the buffer level received from the electronic device 201 in the first state is greater than or equal to the threshold level, the first electronic device for audio 251 may change the master role from the first electronic device for audio 251 to the second electronic device for audio 252 after identifying the elapse of a predetermined time.

According to an embodiment, when it is identified that the buffer level received from the electronic device 201 in the first state is greater than or equal to the threshold level while the first electronic device for audio 251 and/or the second electronic device for audio 252 is being worn on a user's body (e.g., ears), the first electronic device for audio 251 may change the master role from the first electronic device for audio 251 to the second electronic device for audio 252 after elapse of a predetermined time.

According to an embodiment, when both the first electronic device for audio 251 and the second electronic device for audio 252 are not worn on the user's body (e.g., ears), an operation of identifying whether the buffer level received from the electronic device 201 is greater than or equal to a threshold level may not be performed. According to an embodiment, the buffer level may indicate the size of a buffer in which the first electronic device for audio 251 and the second electronic device for audio 252 may store audio data received from the electronic device 201, the buffer level is different depending on the operating state of the electronic device 201 (e.g., the type of the application being executed), and information related to the buffer level corresponding to the operating state of the electronic device 201 may be received from the electronic device 201.

According to an embodiment, the threshold level may indicate a reference level at which the master role may be changed from the first electronic device for audio 251 to the second electronic device for audio 252 in the first state.

According to an embodiment, the buffer level greater than or equal to the threshold level may indicate a sufficient buffer level to prevent or reduce interruption of audio data even when communication with the electronic device 201 is not smooth while changing the master role from the first electronic device for audio 251 to the second electronic device for audio 252 in the first state.

For example, when a music playback-related application having a first buffer level greater than or equal to the threshold level is executed in the electronic device 201, the first electronic device for audio 251 may receive information related to the first buffer level greater than or equal to the threshold level from the electronic device 201 and transmit the information related to the first buffer level to the second electronic device for audio 252. Alternatively, the second electronic device for audio 252 may receive information related to the first buffer level greater than or equal to the threshold level from the electronic device 201. Each of the first electronic device for audio 251 and the second electronic device for audio 252 may output audio data through a speaker while storing the audio data received from the electronic device 201 by the first buffer level. The first electronic device for audio 251 may control to store audio data received from the electronic device 201 in a buffer by the first buffer level in the first state, and may transfer the master role to the second electronic device for audio 252 when the first state is reached while audio data stored in the buffer is output through a speaker.

According to an embodiment, in the first state, when the state stored in the buffer of the first electronic device for audio storing the audio data received from the electronic device 201 meets the condition for changing the master role, and the storage state of the audio data in the buffer that meets the above condition elapses for a predetermined time, the first electronic device for audio 251 may change the master role from the first electronic device for audio to the second electronic device for audio.

According to an embodiment, in the first state, when the data received from the electronic device 201 is information for configuring a buffer level of the first electronic device for audio, and the specified buffer level is greater than or equal to the threshold level, the first electronic device for audio 251 may change the master role from the first electronic device for audio to the second electronic device for audio.

According to various embodiments, as the master role is changed from the first electronic device for audio 251 to the second electronic device for audio 252, the second communication link 272 between the first electronic device for audio 251 and the electronic device 201 is released, and while a new communication link between the second electronic device for audio 252 and the electronic device 201 is generated, the audio data stored to correspond to the buffer levels of each of the first electronic device for audio 251 and the second electronic device for audio 252 may be output, thereby preventing or reducing a phenomenon in which the output of the audio data is interrupted.

According to various embodiments, as the master role is changed from the first electronic device for audio 251 to the second electronic device for audio 252, in a case where the first electronic device for audio 251 or the second electronic device for audio 252 fails to receive audio data from the second communication link 272 with the electronic devices 201, the audio data stored to correspond to the buffer levels of each of the first electronic device for audio 251 and the second electronic device for audio 252 may be output, thereby preventing or reducing a phenomenon in which the output of the audio data is interrupted.

According to various embodiments, the first electronic device for audio 251 may change the master role to the second electronic device for audio 252 that is worn on a user's body (e.g., ears) in the first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to the threshold value.

According to an embodiment, in the first state, when the first electronic device for audio 251 identifies that the first electronic device for audio 251 is not worn on a user's body (e.g., ears) based on a signal received from a sensor (e.g., a proximity sensor) of the first electronic device for audio 251 and receives information from the second electronic device for audio 252 that the second electronic device for audio 252 is currently being worn on the user's body (e.g., ears), the first electronic device for audio 251 may transfer the master role to the second electronic device for audio 252.

According to an embodiment, because the first electronic device for audio 251 serving as a master leads communication with the electronic device 201, when the first electronic device for audio 251 is positioned away from the electronic device by a predetermined distance or is put in a pocket and the like, communication between the first electronic device for audio 251 and the second electronic device for audio 252 is poor, and accordingly, the audio data output from the first electronic device for audio 251 and the second electronic device for audio 252 may be interrupted.

Accordingly, the first electronic device for audio 251 may transfer the master role to the second electronic device for audio 252 worn on the user's body (e.g., ears) in the first state.

According to an embodiment, when it is identified that the first electronic device for audio 251 is not worn on the user's body (e.g., ears) and the second electronic device for audio 252 is worn on the user's body (e.g., ears) in the first state, the first electronic device for audio 251 may change the master role from the first electronic device for audio 251 to the second electronic device for audio 252 after elapse of a predetermined time.

According to an embodiment, in the first state, the first electronic device for audio 251 may identify that the first electronic device for audio 251 is worn on a user's body (e.g., ears) based on a signal received from a sensor (e.g., a proximity sensor) of the first electronic device for audio 251. In this case, when the first electronic device for audio 251 receives information indicating that the second electronic device for audio 252 is not currently worn on a user's body (e.g., an ear) through the first communication link 271, the first electronic device for audio 251 may maintain the master role in the first electronic device for audio 251 without changing the master role to the second electronic device for audio 252.

According to various embodiments, the first electronic device for audio 251 may change the master role from the first electronic device for audio 251 that is not worn on a user's body (e.g., ears) to the second electronic device for audio 252 that is not worn on the user's body (e.g., ears) in the first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to the threshold value.

According to an embodiment, in the first state, the first electronic device for audio 251 may identify that the first electronic device for audio 251 is not worn on a user's body (e.g., ears) based on a signal received from a sensor (e.g., a proximity sensor) of the first electronic device for audio 251. In this case, when the first electronic device for audio 251 receives information from the second electronic device for audio 252 that the second electronic device for audio 252 is currently not worn on the user's body (e.g., ears), the first electronic device for audio 251 may transfer the master role to the second electronic device for audio 252 through the first communication link 271.

According to an embodiment, when it is identified that the first electronic device for audio 251 is not worn on the user's body (e.g., ears) and the second electronic device for audio 252 is not worn on the user's body (e.g., ears) in the first state, the first electronic device for audio 251 may change the master role from the first electronic device for audio 251 to the second electronic device for audio 252 after elapse of a predetermined time.

According to various embodiments, when the audio data is transmitted from the first electronic device for audio 251 to the electronic device for audio 201, the first electronic device for audio 251 may maintain the master role without changing in the first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to the threshold value.

According to an embodiment, when the first electronic device for audio 251 transmits audio data input through a microphone of the first electronic device for audio 251 to the electronic device 201 in the first state, the first electronic device for audio 251 maintain the master role in the first electronic device for audio 251 without changing the master role from the first electronic device for audio 251 to the second electronic device for audio 252.

According to an embodiment, when the electronic device 201 is in an operating state (e.g., making a call) using the microphone the first electronic device for audio in the first state, the first electronic device for audio 251 maintain the master role in the first electronic device for audio 251 without changing the master role to the second electronic device for audio 252 for stability of communication with the electronic device 201.

According to various embodiments, the second electronic device for audio 252 may generate the first communication link 271 with the first electronic device for audio 251, and may be determined as a slave role in a connection process for configuring the first communication link with the electronic device for audio 251.

According to an embodiment, the second electronic device for audio 252 may generate the first communication link 271 with the first electronic device for audio 251 based on Bluetooth communication (e.g., Bluetooth low energy (BLE) communication).

According to an embodiment, the second electronic device for audio 252 may receive sync information, packet information that the second electronic device for audio 252 has not received from the electronic device 201, and/or connection information (e.g., at least one of address information of the electronic device, clock information, channel information, service discovery protocol (SDP) result information, supported feature, manufacture data, or key information (e.g., link key)) on the second communication link generated between the first electronic device for audio 251 and the electronic device 201 from the first electronic device for audio 251 through the first communication link 271.

According to an embodiment, the second electronic device for audio 252 may monitor 281 and receive data transmitted from the electronic device 201 based on connection information on the second communication link received from the first electronic device for audio 251.

According to various embodiments, when a role change for the master role is requested from the first electronic device for audio, the second electronic device for audio 252 may change from a slave role to a master role, and may perform the same operation as an operation performed when the first electronic device for audio 251 is in the master role.

According to various embodiments, the electronic device 201 may generate the second communication link with the first electronic device for audio 251 determined as a master role, and may transmit and receive data to and from the first electronic device for audio 251.

According to an embodiment, the electronic device 201 may generate the second communication link 272 with the first electronic device for audio 251 based on Bluetooth communication (e.g., Bluetooth low energy (BLE) and Bluetooth legacy communication)

Referring to FIG. 2B, according to various embodiments, when the second communication link generated with the electronic device 201 is released 273 in the first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to a threshold value, the first electronic device for audio 251 determined as the master role may change the master role from the first electronic device for audio 251 to the second electronic device for audio 252.

Referring to FIG. 2C, according to various embodiments, a pair of electronic devices for audio 250 including the first electronic device for audio 251 and the second electronic device for audio 252 may be inserted into a charging case device 290.

According to an embodiment, in a case where the charging case device 290 is able to supply power (e.g., in a case where power is able to be supplied from the battery of the charging case device), a pair of electronic devices for audio 250 may be inserted while performing charging by receiving power from the charging case device 290.

According to an embodiment, in a case where the charging case device 290 is unable to supply power (e.g., in a case where power is unable to be supplied from the battery of the charging case device), a pair of electronic devices for audio 250 may maintain only the inserted state without power supply from the charging case device 290.

According to various embodiments, when it is identified that the cover of the charging case device 290 into which a pair of electronic devices for audio 250 is inserted is open in the first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to a threshold value, the first electronic device for audio 251 determined as the master role may change the master role from the first electronic device for audio 251 to the second electronic device for audio 252.

According to an embodiment, when the first electronic device for audio 251 detects that the cover is opened from the charging case device 290, the first electronic device for audio 251 may connect the first communication link with the second electronic device for audio 252. The first electronic device for audio 251 may receive the second remaining battery capacity of the second electronic device for audio 252 through the first communication link. In case of the first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to a threshold value, the first electronic device for audio 251 may change the master role from the first electronic device for audio 251 to the second electronic device for audio 252. The first electronic device for audio 251 may transfer the master role to the second electronic device for audio 252 and perform a slave role.

According to an embodiment, when the first electronic device for audio 251 receives information indicating that the cover is opened from the charging case device 290, the first electronic device for audio 251 may transfer the master role to the second electronic device for audio 252 and perform a slave role.

According to an embodiment, when the first electronic device for audio 251 receives information indicating that the cover is opened from the charging case device 290 in the first state, the first electronic device for audio 251 may switch to a standby state preparing to generate a communication link with the electronic device 201, and transfer the master role to the second electronic device for audio 252 and perform a slave role when the standby state elapses for a predetermined time.

Figure 3:
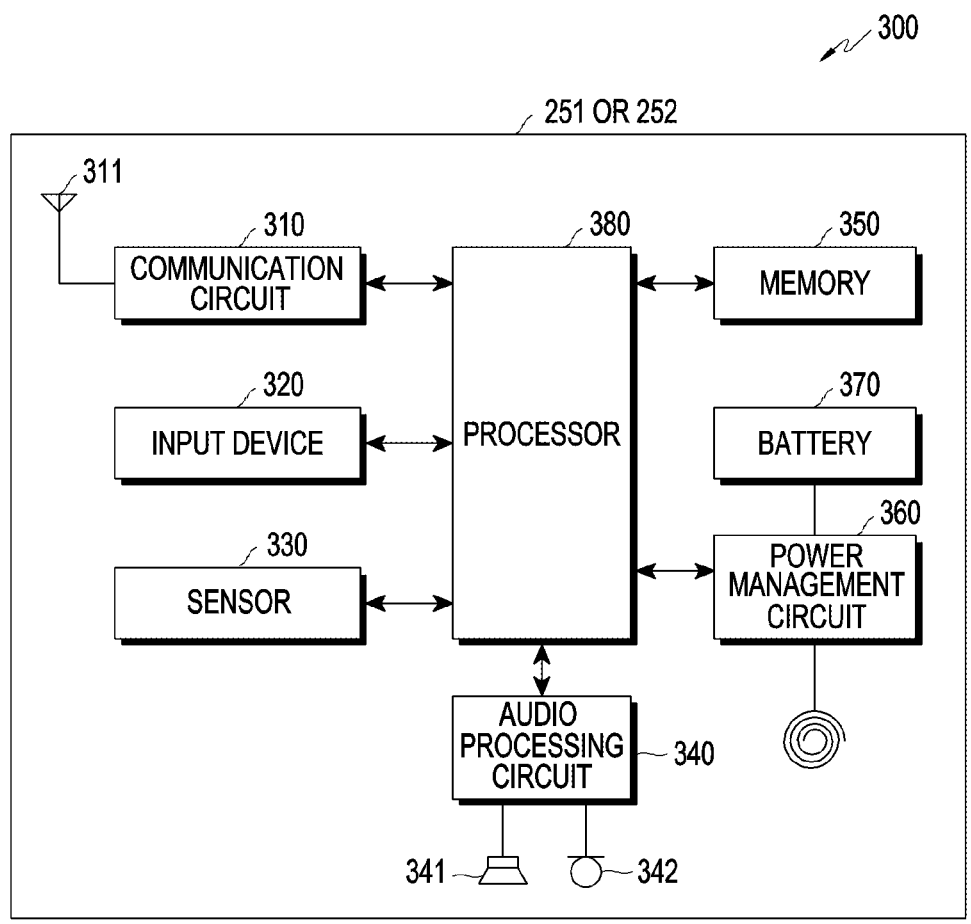
FIG. 3 is a block diagram of an electronic device for audio according to various example embodiments.

FIG. 3 is a block diagram 300 of an electronic device for audio according to various embodiments. The block diagram of the electronic device for audio of FIG. 3 may represent a block diagram of the first electronic device for audio 251 or the second electronic device for audio 252 of FIGS. 2A to 2B.

Referring to FIG. 3, the electronic device for audio 251 or 252 may include a communication circuit 310, an antenna 311, an input device 320, a sensor 330, an audio processing circuit 340, a memory 350, a power management circuit 360, a battery 370, and a processor 380.

According to various embodiments, the electronic device for audio 251 or 252 may include not only an audio output device such as an earphone, a headset, or a speaker, but also an electronic device capable of receiving and outputting audio data from an electronic device.

According to various embodiments, the communication circuit 310 may support wireless communication with an electronic device (e.g., a smartphone) (e.g., the electronic device 201 of FIG. 1). According to various embodiments, the communication circuit 310 may support various types of communication using the antenna 311.

According to an embodiment, the communication circuit 310 may include various RF components between the antenna 311 and the processor 380. For example, in receiving a wireless signal, the communication circuit 210 may receive a wireless signal from the antenna 311, convert the received wireless signal into a baseband signal, and transmit the converted baseband signal to the processor 280. The processor 280 may process the received baseband signal and control components of the electronic device for audio 251 and/or 252 in response to the received baseband signal. In transmission of the wireless signal, the processor 380 may generate a baseband signal and output the baseband signal to the communication circuit 310. The communication circuit 310 may receive a baseband signal from the processor 380, convert the received baseband signal into a wireless signal, and radiate the wireless signal to the outside through the antenna 311.

According to various embodiments, the communication circuit 310 may support wired or wireless communication with an external device (e.g., a charging case device or a cradle). The communication circuit 310 may be electrically connected to at least one contact disposed on the outer surface of the housing of the electronic device for audio 251 or 252. When the electronic device for audio 251 or 252 is mounted on the mounting part of the external device (e.g., a charging case device or a cradle), at least one contact of the electronic device for audio 251 or 252 may be electrically connected to at least one contact installed on the mounting part of the external device.

According to various embodiments, the communication circuit 310 may support reception of audio data (or audio content) from an electronic device (e.g., a server, a smartphone, a PC, a PDA, or an access point).

According to various embodiments, the communication circuit 310 may support transmission of audio data between a pair of electronic devices for audio (e.g., the first electronic device for audio 251 and the second electronic device for audio 252 of FIG. 2) and the second electronic device for audio 252.

According to various embodiments, the communication circuit 310 may support cellular communication. The cellular communication may include, for example, at least one of long-term evolution (LTE), LTE advance (LTE-A), code division multiple access (CDMA), wideband CDMA (WCDMA), universal mobile telecommunications system (UMTS), wireless broadband (Wibro), or global system for mobile communications (GSM).

According to various embodiments, the communication circuit 310 may support various types of communication. The communication circuit 310 may support short-range communication. The short-range communication may include, for example, at least one of wireless fidelity (WiFi), Bluetooth, near field communication (NFC), or global navigation satellite system (GNSS).

According to various embodiments, an antenna (not illustrated) (e.g., a wireless charging coil) for supporting wireless charging may be included. The antenna for wireless charging may be used to wirelessly receive power from an external device.

According to various embodiments, the antenna 311 may be a metal member of various types installed in the electronic device for audio 251 or 252. According to an embodiment, the antenna 311 may be disposed inside the housing or may configure a part of one surface of the housing. According to various embodiments, in a case where the housing is configured by metal, the antenna 311 may include a partial metal area or an entire metal area of the housing.

According to various embodiments, the antenna 311 may be mounted on a printed circuit board (PCB) not illustrated on which the communication circuit 310 is mounted.

According to various embodiments, the input device 320 may be configured to generate various input signals required to operate the electronic device for audio 251 or 252. The input device 320 may include a touch panel, a touch pad, or a button. The touch pad may recognize a touch input, for example, in at least one of a capacitive, a resistive, an infrared type, or a surface acoustic wave type. In a case where a capacitive touch pad is provided, physical contact or proximity recognition may be possible. The touch pad may further include a tactile layer. The touch pad including the tactile layer may provide a tactile response to the user. A button may include, for example, a physical button, and/or an optical key.

According to various embodiments, the input device 320 may generate a user input regarding turning on or off the electronic device for audio 251 or 252. According to various embodiments, the input device 320 may generate a user input related to communication (e.g., short-range communication) connection with the first electronic device for audio 251 or 252 and the electronic device (e.g., the electronic device 201 of FIG. 2).

According to an embodiment, the input device 320 may generate a user input related to audio data (or audio content). For example, the user input may relate to functions of starting playback of audio data, pausing playback, stopping playback, adjusting playback speed, adjusting playback volume of audio data, and/or mute.

According to various embodiments, the sensor 330 may detect information or signals on whether the electronic device for audio 251 or 252 is coupled to the ear. According to various embodiments, the sensor 330 may detect information or signals on whether the electronic device for audio 251 or 252 is coupled to an external device (e.g., a charging case device).

The sensor 330 may measure a physical quantity or detect an operating state of the electronic device for audio 251 or 252. The sensor 330 may convert the measured or detected information into an electrical signal. The sensor 330 may include, for example, an acceleration sensor, a gyro sensor, a geomagnetic sensor, a magnetic sensor, a proximity sensor, a gesture sensor, a grip sensor, and/or a biometric sensor.

According to various embodiments, although not illustrated, the electronic device for audio 251 or 252 may include a member to be detected corresponding to a sensor of an external device (e.g., a charging case device). For example, the external device may include a Hall IC installed in the mounting part, and the electronic device for audio 251 or 252 may include a magnet. When the electronic device for audio 251 or 252 is coupled to the mounting part of the external device, the Hall IC of the external device may recognize the magnet included in the electronic device for audio 251 or 252 and output a signal related to coupling of the external device and electronic device for audio 251 or 252.

According to various embodiments, the external device may include a contact installed in the mounting part, and the electronic device for audio 251 or 252 may include a contact installed in the housing. When the electronic device for audio 251 or 252 is coupled to the mounting part of the external device, the contact of the external device and the contact of the electronic device for audio 251 or 252 may be electrically connected, and the external device may recognize the coupling of the electronic device for audio 251 or 252.

According to various embodiments, the audio processing circuit 340 may support an audio data collection function. The audio processing circuit 340 may play back the collected audio data. According to an embodiment, the audio processing circuit 340 may include an audio decoder (not illustrated) and a D/A converter (not illustrated). The audio decoder may convert audio data stored in the memory 350 into a digital audio signal. The D/A converter may convert the digital audio signal converted by the audio decoder into an analog audio signal. According to various embodiments, the audio decoder may convert audio data received from the electronic device (e.g., a server, a smartphone, a PC, a PDA, and/or an access point) through the communication circuit 310 and stored in the memory 250 into a digital audio signal. The speaker 341 may output the analog audio signal converted by the D/A converter.

According to various embodiments, the audio processing circuit 340 may modulate (e.g., decode) data to output audio data received from the electronic device (e.g., a server, a smartphone, a PC, a PDA, and/or an access point) and stored in the memory 350 to the speaker.

According to an embodiment, the audio processing circuit 340 may include an A/D converter (not illustrated). The A/D converter may convert the analog voice signal transmitted through the microphone 342 into a digital voice signal.

According to various embodiments, the audio processing circuit 340 may play back various audio data configured in an operational operation of the electronic device for audio 251 or 252. For example, when it is detected that the electronic device for audio 251 or 252 is coupled to or detached from the ear, the audio processing circuit 340 may be designed to play back audio data related to a corresponding effect or guide sound. According to various embodiments, when it is detected that the electronic device for audio 251 or 252 is coupled to or detached from the electronic device (e.g., a charging case device), the audio processing circuit 340 may be designed to play back audio data related to a corresponding effect or guide sound. The output of the sound effect or guide sound may be omitted according to a user configuration or a designer's intention. According to various embodiments, the audio processing circuit 340 may be designed to be included in the processor 380.

According to various embodiments, the memory 350 may store data and/or application programs and algorithms corresponding to various operating systems and various user functions required for operating the electronic device for audio 251 or 252. The memory 350 may include, for example, a high-speed random access memory and/or a nonvolatile memory such as one or more magnetic disk storage devices, one or more optical storage devices, and/or a flash memory (e.g., NAND or NOR).

According to an embodiment, the memory 350 may include a non-volatile memory that stores first audio data (non-volatile audio data) received from an electronic device (e.g., a server, a smartphone, a PC, a PDA, and/or an access point). According to various embodiments, the memory 350 may include a volatile memory that stores second audio data (volatile audio data) received from the electronic device.

According to various embodiments, the power management circuit 360 (e.g., power management integrated circuit (PMIC)) may efficiently manage and optimize power use of the battery 370 in the electronic device for audio 251 or 252. According to an embodiment, the power management circuit 360 may supply power to the processor 380 according to a load to be processed by the processor 380.

The power management circuit 360 may include a battery charging circuit. According to an embodiment, in a case where the electronic device for audio 251 or 252 is coupled to an external device (e.g., a charging case device), the power management circuit 360 may receive power from the external device to charge the battery 370.

According to various embodiments, the power management circuit 360 may include a wireless charging circuit. The power management circuit 360 may wirelessly receive power from an external device (e.g., a charging case device) through a wireless charging antenna (not illustrated), and charge the battery 370 by using the received power.

According to various embodiments, the electronic device for audio 251 or 252 may include a display device (not illustrated). The display device may be configured to provide various screen interfaces necessary for operating the electronic device for audio 251 or 252. The display device may provide a user interface related to playback of audio data. According to various embodiments, the display device may provide the user interface related to a function of receiving audio data from the electronic device (e.g., the electronic device 101 of FIG. 1) or a function of transmitting audio data to the electronic device.

According to various embodiments, the display device may include a light emitting means, or light source, such as a light emitting diode (LED). For example, the light emitting means may be controlled to emit a color light corresponding to charging or completion of charging. For example, in a case where the electronic device for audio 251 or 252 is communicatively connected to the electronic device (e.g., a smartphone and/or a web server), the light emitting means may be controlled to emit light of a specific color. For example, according to the playback state (e.g., during playback and/or pause playback) of the audio data, the light emitting means may be controlled to emit light of a specific color. For example, according to a user input generated through the input device, the light emitting means may be controlled to emit light of a specific color.

According to various embodiments, the battery 370 may supply power to components in the electronic device for audio 251 or 252.

According to various embodiments, the processor 380 may be configured to control various signal flow control and information collection and/or output related to audio data.

The processor 380 may support various operations based on at least a part of the user input received from the input device 320. According to an embodiment, the processor 380 may turn on or off the electronic device for audio 251 or 252 according to a user input. According to an embodiment, the processor 380 may communicatively connect the electronic device for audio 251 or 252 to the electronic device (e.g., the electronic device 101 of FIG. 1 and/or the electronic device 201 of FIG. 2) according to a user input. According to an embodiment, the processor 380 may receive audio data from the electronic device or transmit audio data to the electronic device according to a user input. According to an embodiment, the processor 380 may play back audio data or control the playback according to a user input (e.g., start playback of audio data, pause playback, stop playback, control playback speed, control playback volume of audio data, or mute).

The processor 380 may be designed to receive audio data from an electronic device (e.g., a server, a smartphone, a PC, a PDA, and/or an access point) through the communication circuit 310 and store the received audio data in the memory 350. According to an embodiment, the processor 380 may receive non-volatile audio data (or download audio data) from the electronic device and store the received non-volatile audio data in a non-volatile memory. According to various embodiments, the processor 380 may receive volatile audio data (or streaming audio data) from the electronic device (e.g., the electronic device 101 of FIG. 1 and/or the electronic device 201 of FIG. 2) and store the received volatile audio data in a volatile memory.

According to an embodiment, the processor 380 may play back audio data (e.g., non-volatile audio data or volatile audio data) stored in the memory 350 and output the same through the speaker 341. The processor 380 may obtain an audio signal by decoding the audio data (audio data playback). The processor 380 may output the obtained audio signal through the speaker 341.

According to various embodiments, the processor 380 may receive an audio signal from the electronic device (e.g., the electronic device 101 of FIG. 1 and/or the electronic device 201 of FIG. 2) and output the obtained audio signal through the speaker 341. The processor 380 may transmit the obtained audio signal to the electronic device for audio 251 or 252.

According to various embodiments, the processor 380 may perform various operations based on at least a part of information obtained from the sensor 330. According to an embodiment, the processor 380 may determine whether the electronic device for audio 251 or 252 is worn on the ear from the information obtained from the sensor 330. When it is identified that the electronic device for audio 251 or 252 is worn on the ear, the processor 380 may play back audio data stored in the memory 350 according to a user input for audio data playback and output the audio data to the speaker 341. According to an embodiment, the processor 380 may play back audio data or control the playback according to the wearing state (e.g., start playback of audio data, pause playback, stop playback, control playback speed, control playback volume of audio data, or mute).

According to an embodiment, the processor 380 may transmit an electrical signal from the light receiver of the sensor 330 to the outside. The electronic device for audio 251 or 252 may analyze the obtained electrical signal to obtain information related to the corresponding detection mode (e.g., proximity detection mode and/or biometric detection mode). According to an embodiment, the processor 308 may determine the heart rate based on the electrical signal transmitted from the light receiver of the sensor 330 of the electronic device for audio 251 or 252 in the heart rate detection mode of the electronic device for audio 251 or 252 and/or the electronic device (e.g., the electronic device 101 of FIG. 1 and/or the electronic device 201 of FIG. 2).

According to various embodiments, the processor 380 may analyze the obtained electrical signal from the light receiver of the sensor 330 to obtain information related to the corresponding detection mode (e.g., proximity detection mode and/or biometric detection mode). The processor 380 may transmit the obtained information to the electronic device (e.g., the electronic device 101 of FIG. 1 and/or the electronic device 201 of FIG. 2) by using the communication circuit 310. The processor 380 may output the obtained information through the speaker 341.

According to various embodiments, in a mode in which the electronic device for audio 251 or 252 receives audio data from the electronic device (e.g., the electronic device 101 and/or the electronic device 201 of FIG. 2), plays back the audio data, and outputs the audio data to the speaker 341, when it is identified that the electronic device for audio 251 or 252 is not worn on the ear, the processors 380*a* and 380*b* may stop the mode or transmit a signal thereto to the electronic device. The electronic device may receive a signal related to a state in which the electronic device for audio 251 or 252 is not worn on the ear, and may stop transmitting audio data to the electronic device for audio 251 or 252.

According to various embodiments, in a mode in which the electronic device for audio 251 or 252 receives audio signal from the electronic device (e.g., the electronic device 101 and/or the electronic device 201 of FIG. 2) and outputs the audio signal to the speaker 341, when it is identified that the electronic device for audio 251 or 252 is not worn on the ear, the processors 380 may stop the mode or transmit a signal thereto to the electronic device. The electronic device may receive a signal related to a state in which the electronic device for audio 251 or 252 is not worn on the ear, and may stop playing back the audio data and transmitting the audio signal.

According to various embodiments, when it is identified that the electronic device for audio 251 or 252 is worn on the ear, the processor 380 may activate a biometric sensor (e.g., a heart rate sensor). When it is identified that the electronic device for audio 251 or 252 is not worn on the ear, the processor 380 may deactivate the biometric sensor.

According to various embodiments, the electronic device for audio 251 or 252 may become a master device or a slave device. According to an embodiment, in a case where the electronic device for audio 251 is the master device, the electronic device for audio 251 may not only output the audio signal received from the electronic device 101 (e.g., the electronic device 101 of FIG. 1 and/or the electronic device 201 of FIGS. 2A to 2B) to the speaker 341a, but may also transmit the received audio signal to another electronic device for audio 252 that is a slave device.

According to various embodiments, the electronic device for audio 251 or 252 may provide a voice recognition function for generating a voice command from an analog voice signal received by using the microphone 342. The voice command may relate to an input to support reception, transmission and/or playback of audio data.

According to various embodiments, the electronic device for audio 251 or 252 may further include various modules according to the provision form thereof. It is not possible to enumerate all of the variations due to the convergence trend of digital devices, but components equivalent to the above-mentioned components may be additionally included in the electronic device for audio 251 or 252. In addition, in the electronic device for audio 251 or 252 according to an embodiment, specific components may be excluded from the above components or replaced with other components according to the type of provision thereof. This may be easily understood by those skilled in the art. For example, the electronic device for audio 251 or 252 may be configured to include at least a part of the configuration of the electronic device illustrated in FIG. 1.

According to various embodiments, a case in which the electronic device for audio 251 operates while performing a master role will be described as follows.

According to various embodiments, the electronic device for audio 251 may manage power of a pair of electronic devices for audio 251 and 252 in a state in which a first communication link is generated with another electronic device for audio 252 operating as a pair and a second communication link is generated with the electronic device (e.g., the electronic device 201 of FIG. 2) through the communication circuit 310.

According to an embodiment, the first electronic device for audio 251 may change the master role from the first electronic device for audio to the second electronic device for audio after elapse of a predetermined time when it is identified that the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to a threshold value.

According to an embodiment, the first electronic device for audio 251 may change the master role from the first electronic device for audio to the second electronic device for audio after elapse of a predetermined time when it is identified that the buffer level received from the electronic device in which the second communication link is generated is greater than or equal to a threshold level in the first state.

According to an embodiment, the first electronic device for audio 251 may change the master role from the first electronic device for audio to the second electronic device for audio after elapse of a predetermined time when it is identified that the electronic device for audio 251 is not worn and the other electronic device for audio 252 is worn in the first state.

According to an embodiment, the first electronic device for audio 251 may change the master role from the first electronic device for audio to the second electronic device for audio after elapse of a predetermined time when it is identified that the electronic device for audio 251 is not worn and the other electronic device for audio 252 is not worn in the first state.

According to an embodiment, the first electronic device for audio 251 may change the master role from the first electronic device for audio to the second electronic device for audio when it is identified that audio data is being transmitted to the electronic device through the second communication link from the electronic device for audio 251 in the first state.

According to various embodiments, the electronic device for audio 251 may manage power of a pair of electronic devices for audio 251 and 252 in a state in which a first communication link is generated with another electronic device for audio 252 operating as a pair and a second communication link is released with the electronic device (e.g., the electronic device 201 of FIG. 2) through the communication circuit 310.

According to an embodiment, the first electronic device for audio 251 may change the master role from the first electronic device for audio to the second electronic device for audio when the second communication link generated with the electronic device is released in the first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to a threshold value.

According to various embodiments, the electronic device for audio 251 may manage power of a pair of electronic devices for audio 251 and 252 in a standby state in which a first communication link is generated with another electronic device for audio 252 operating as a pair through the communication circuit 310 and a second communication link is being prepared with the electronic device (e.g., the electronic device 201 of FIG. 2).

According to an embodiment, the first electronic device for audio 251 may switch to the standby state when it is identified that the cover of the charging case device 290 into which the electronic device for audio 251 and the other electronic device for audio 252 are inserted is in an open state in the first state in which the first remaining battery capacity of the first electronic device for audio 251 is smaller than the second remaining battery capacity of the second electronic device for audio 252, and the difference between the first remaining battery capacity of the first electronic device for audio 251 and the second remaining battery capacity of the second electronic device for audio 252 is greater than or equal to a threshold value, and may change the master role from the first electronic device for audio to the second electronic device for audio after elapse of a predetermined time.

Figure 4:
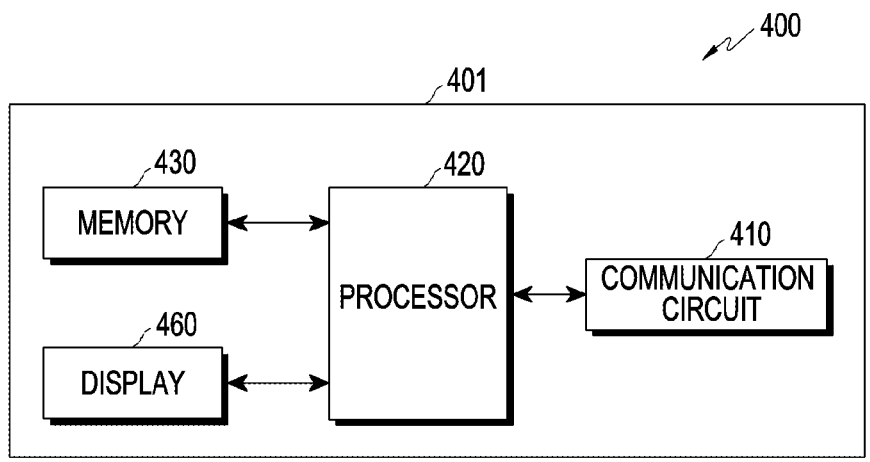
FIG. 4 is a block diagram of an electronic device according to various example embodiments.

FIG. 4 is a block diagram 400 of an electronic device according to various embodiments.

The block diagram of the electronic device of FIG. 4 may represent a block diagram of the electronic device 201 of FIGS. 2A to 2B.

Referring to FIG. 4, the electronic device 201 (e.g., the electronic device 101 of FIG. 1) may include a processor 420, a memory 430, a communication circuit 450, and a display 460.

According to various embodiments, the electronic device 201 may be implemented to be substantially the same as or similar to the electronic device 101 of FIG. 1. For example, the electronic device 201 may be implemented as a smartphone supporting Bluetooth communication.

According to various embodiments, the electronic device 201 may generate a communication link with a pair of electronic devices for audio (e.g., the first and second electronic devices for audio 251 and 252 of FIGS. 2A to 2B) by using the communication circuit 410 (e.g., Bluetooth communication). According to an embodiment, the pair of external electronic devices for audio may be implemented as electronic devices supporting Bluetooth communication.

According to various embodiments, the communication circuit 410 may be implemented substantially the same as or similar to the communication module 190 of FIG. 1, and may include a plurality of communication circuits using different communication technologies including the communication circuit 410. According to an embodiment, the communication circuit 410 is a communication circuit capable of performing Bluetooth communication, and may perform Bluetooth legacy communication and BLE communication.

According to various embodiments, the processor 420 may control the overall operation of the electronic device 201. The processor 420 may be implemented substantially the same as or similar to the processor 120 of FIG. 1.

According to various embodiments, the electronic device 401 (e.g., the processor 420 or the communication circuit 410) may generate a communication link (e.g., the second communication link 272 in FIG. 2A) with an external electronic device for audio (e.g., the first electronic device for audio 251 of FIG. 2A) serving as the master among a pair of electronic devices for audio, and may transmit data through the generated communication link.

According to various embodiments, the memory 430 may be implemented substantially the same as or similar to the memory 130 of FIG. 1, and may store various data of the electronic device 201. For example, data to be transmitted to the electronic device for audio or data received from the electronic device for audio may be stored.

According to various embodiments, the display 460 may be implemented substantially the same as or similar to the display device 160 of FIG. 1. According to an embodiment, the display 460 may display information (e.g., connection information and/or battery information) on a pair of electronic devices for audio in which a communication link is generated with the electronic device.

Figure 5:
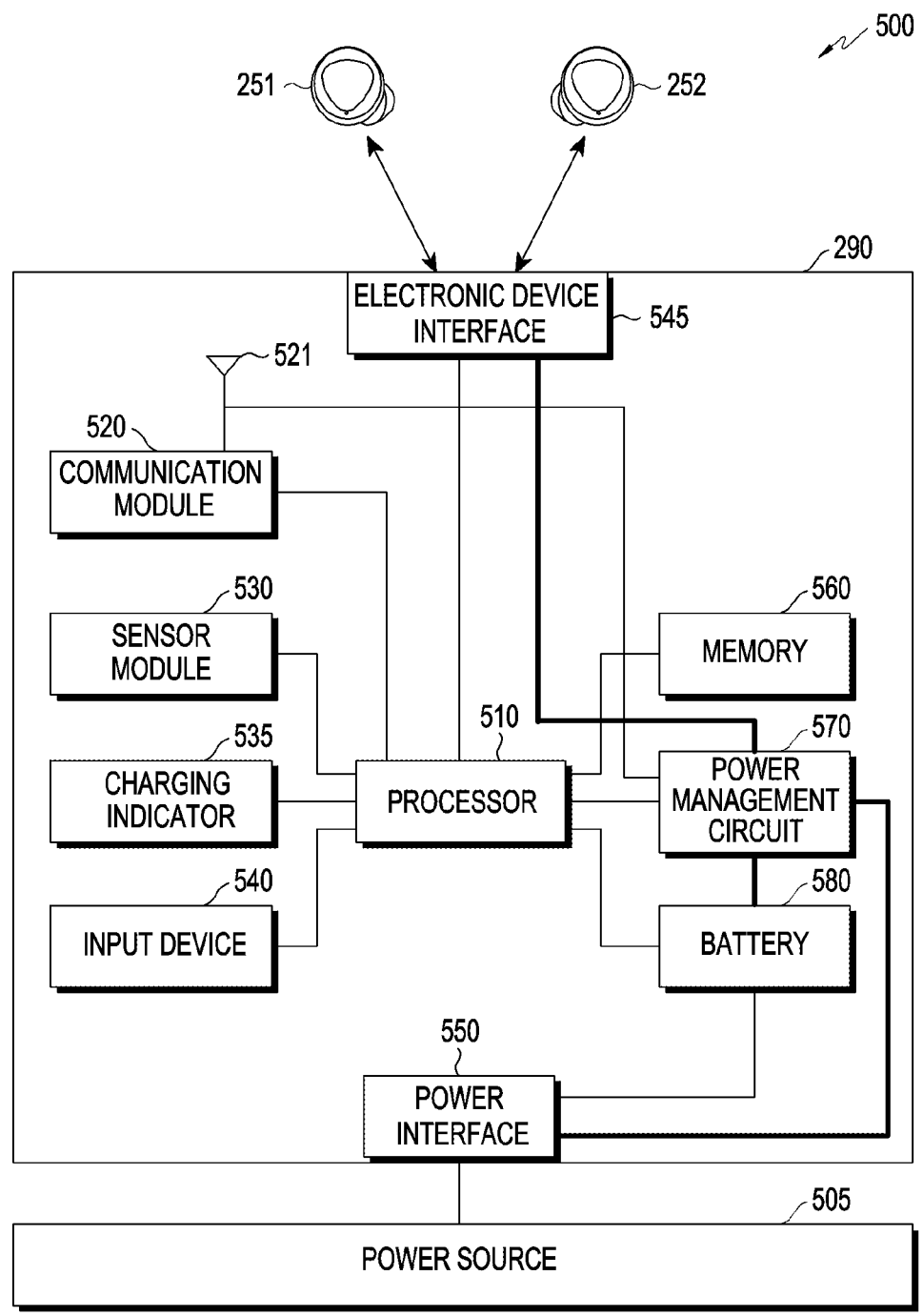
FIG. 5 is a block diagram of a charging case device for storing an electronic device for audio according to various example embodiments.

FIG. 5 is a block diagram of a charging case device for storing an electronic device for audio according to various embodiments. The block diagram of the charging case device of FIG. 5 may represent the block diagram of the charging case device 290 of FIG. 2C.

Referring to FIG. 5, the charging case device 290 may be a case device for storing the first electronic device 251 for audio and the second electronic device for audio 252, which are a pair of electronic devices for audio. The charging case device 290 may include a processor 510, an antenna module 521, a communication module 520, a sensor module 530, at least one charging indicator 535, an input device 540, an electronic device interface 545, a power interface 550, a memory 560, a power management module 570, and a battery 580. Each "module" herein may comprise circuitry.

For example, the processor 510 (preferably including a processing circuitry) may execute software to control at least one other component (e.g., hardware or software components) of the charging case device 290 connected to the processor 510 and may perform various data processing or operations. According to an embodiment, as at least part of data processing or operation, the processor 510 may load a command or data received from another component (e.g., the sensor module 530 or the communication module 520) into the volatile memory 560, process the command or data stored in the volatile memory, and store the result data in the non-volatile memory.

The communication module 520, preferably comprising a communication circuitry, may include a wireless communication module (e.g., a cellular communication module, a wireless fidelity (WiFi) communication module, a Bluetooth communication module, a near field communication (NFC) communication module, or a global navigation satellite system (GNSS) communication module) or a wired communication module (e.g., a local area network (LAN) communication module or a power line communication module). A corresponding communication module among these communication modules may communicate with at least one of the electronic device (e.g., the electronic device 201 of FIG. 2) (e.g., the mobile terminal) or the pair of electronic devices for audio 251 and 252 through the first network (e.g., the first network 198 of FIG. 1 or the second network (e.g., the second network 199 of FIG. 1)). The communication module 520 may include one or more communication processors that operate independently of the processor 510 and support direct (e.g., wired) communication or wireless communication.

The antenna module 521 (preferably including at least one antenna) may transmit a signal or power to another electronic device (e.g., the electronic device 201 of FIG. 2 or a pair of electronic devices for audio 251 and 252), or may receive the signal or power from the other electronic device. According to an embodiment, the antenna module 521 may include one antenna including a conductor disposed on a substrate (e.g., a PCB) or a radiator composed of a conductive pattern. According to an embodiment, the antenna module 521 may include a plurality of antennas. In this case, at least one antenna suitable for a communication method used in a communication network such as the first network (e.g., the first network of FIG. 1) or the second network (e.g., the second network 199 of FIG. 2) may be selected from the plurality of antennas by, for example, the communication module 520. A signal or power may be transmitted or received between the communication module 520 and another electronic device through the selected at least one antenna. According to an embodiment, components (e.g., RFIC) other than the radiator may be additionally formed as a part of the antenna module 521.

According to various embodiments, the antenna module 521 may include at least one of a coil in which a current is induced by a magnetic field to wirelessly receive power from a power source 505 or an electronic device (e.g., the electronic device 201 of FIG. 2), a resonator in which a resonance occurs by a magnetic field having a specific resonance frequency, and a plurality of patch antennas for receiving electromagnetic waves.

According to various embodiments, the antenna module 521 may include at least one of a coil for forming a change in a magnetic field to wirelessly transmit power to a pair of electronic devices for audio 251 and 252, a resonator for forming a magnetic field having a specific resonant frequency, and a plurality of patch antennas for transmitting electromagnetic waves.

The sensor module 530 (preferably including at least one sensor) may measure a physical quantity or detect an operating state of the charging case device 290. The sensor module 530 may convert measured or detected information into an electrical signal. The sensor module 350 may include, for example, an acceleration sensor, a gyro sensor, a geomagnetic sensor, a magnetic sensor, a proximity sensor, a gesture sensor, a grip sensor, an optical sensor, or a biometric sensor. According to an embodiment, the sensor module 530 may detect whether one or more of the pair of electronic devices for audio 251 and 252 is located in the charging case device 290. According to an embodiment, the sensor module 530 may detect a case in which the cover of the charging case device 290 is in an open state and a case in which the cover is in a closed state. According to an embodiment, the processor 510 may be electrically connected (directly or indirectly) to the sensor module 530, and may receive signals indicating an open state and a closed state of the cover from the sensor module 530. In a case where one or more of the pair of electronic devices for audio 251 and 252 is located in the charging case device 290 and the cover is changed from the closed state to the open state, the processor 510 may generate a signal to turn on the communication module (e.g., the communication module 310 of FIG. 3) of the pair of electronic devices for audio 251 and 252, and in a case where one or more of the pair of electronic devices for audio 251 and 252 is located in the charging case device 290 and the cover is changed from the open state to the closed state, the processor 510 may generate a signal to turn off the communication module (e.g., the communication module 310 of FIG. 3) of the pair of electronic devices for audio 251 and 252. According to an embodiment, in a case where the cover is in the open state, the sensor module 530 may trigger the processor 510 so that the pair of electronic devices for audio 251 and 252 and the electronic device (e.g., the electronic device 201 of FIG. 2) enter the pairing mode.

At least one charging indicator 535 may display the charging level of the battery 580 and/or the battery (e.g., the battery 370 in FIG. 3) of a pair of electronic devices for audio 251 and 252. A user may identify a charging amount of the battery 580 of the charging case device 290 or a charging amount of the battery (e.g., the battery 370 in FIG. 3) of the pair of electronic devices for audio 251 and 252 through the charging indicator 535 on the surface of the charging case device 290. The charging indicator 535 may be implemented as a display, or may be implemented as an LED.

According to various embodiments, the input device 540 may be configured to generate various input signals required to operate the charging case device 290. The input device 540 may include a touch pad, a touch panel, or a button. The touch pad may recognize a touch input, for example, in at least one of a capacitive, a resistive, an infrared type, or a surface acoustic wave type. In a case where a capacitive touch pad is provided, physical contact or proximity recognition may be possible. The touch pad may further include a tactile layer. The touch pad including the tactile layer may provide a tactile response to the user. A button may include, for example, a physical button, and/or an optical key.

The electronic device interface 545 may support one or more designated protocols that may be used for the charging case device 290 to be directly or wirelessly connected to the pair of electronic devices for audio 251 and 252 According to an embodiment, the electronic device interface 545 may include, for example, a high definition multimedia interface (HDMI), a universal serial bus (USB) interface, an SD card interface, or an audio interface. According to an embodiment, the interface 545 may include a connection terminal for forming a physical connection with a pair of electronic devices for audio 251 and 252. According to an embodiment, the processor 510 may identify whether the physical connection is formed between the charging case device 290 and the pair of electronic devices for audio 251 and 252 through the electronic device interface 545. According to an embodiment, in a case where the processor 510 identifies the physical contact between the charging case device 290 and the pair of electronic devices for audio 251 and 252 through the electronic device interface 545, the processor 510 may generate a charging signal for initiating charging of the pair of electronic devices for audio 251 and 252. According to one embodiment, the processor 510 may identify that one or both of the pair of electronic devices for audio 251 and 252 are removed from the charging case device 290 through the electronic device interface 545, and may generate a removal signal for stopping charging the removed pair of electronic devices for audio 251 and/or 252.

The power interface 550 may support one or more designated protocols that may be used for the charging case device 290 to be directly or wirelessly connected to the power source 505 or the electronic device (e.g., the electronic device 201 of FIG. 2). The power interface 550 according to an embodiment may include a USB connector, a lighting connector, or a part of a receptacle connector for another connector that may provide power to the charging case device 290. The power interface 550 according to an embodiment may adopt a structure including an antenna (not illustrated) to wirelessly receive power from the power source 505 or the electronic device (e.g., the electronic device 201 of FIG. 2).

The memory 560 may store various data used by at least one component (e.g., the processor 510 or the sensor module 530) of the charging case device 290. The data may include, for example, input data or output data for software and related commands. The memory 560 may include a volatile memory or a non-volatile memory.

The power management module 570, preferably including a power management circuitry, may manage power supplied to a pair of electronic devices for audio 251 and 252. According to an embodiment, the power management module 570 may be implemented as, for example, at least a part of a power management integrated circuit (PMIC). According to an embodiment, the power management module 570 may include a battery charging module. According to an embodiment, the power management module 570 may charge the battery 580 by receiving power in a wireless or wired manner from the power source 505 under the control of the processor 510. According to an embodiment, the power management module 350 may provide power of the battery 580 to a pair of electronic devices 291 and 292 for audio in a wireless or wired manner through the electronic device interface 545 or the antenna module 521 under the control of the processor 510.

The battery 580 may supply power to at least one component of the charging case device 290. According to an embodiment, the battery 580 may include, for example, a rechargeable secondary battery.

According to various embodiments, the charging case device 290 may further include various modules according to the provision form thereof. It is not possible to enumerate all of the variations due to the convergence trend of digital devices, but components equivalent to the above-mentioned components may be additionally included in the first external electronic device 301. In addition, in the first external electronic device 301 according to an embodiment, specific components may be excluded from the above components or replaced with other components according to the type of provision thereof. This may be easily understood by those skilled in the art.

According to various embodiments, an electronic device for audio (e.g., the first electronic device for audio 251 of FIG. 2A and/or the electronic device for audio 251 of FIG. 3) may include a communication circuit (e.g., the communication module 310 of FIG. 3, preferably including communication circuitry) and a processor operatively connected (directly or indirectly) to the communication circuit (e.g., the processor 380 of FIG. 3), and the processor may be configured to generate a communication link (e.g., the first communication link 271 of FIG. 2A) with a first electronic device for audio by using the communication circuit, and change a master role from the electronic device for audio (e.g., the first electronic device for audio 251 of FIG. 2A) to the first electronic device for audio (e.g., the second electronic device for audio 252 of FIG. 2A) when identifying a first state in which the remaining battery capacity of the electronic device for audio is smaller than the remaining battery capacity of the first electronic device for audio, and a difference between the remaining battery capacity of the electronic device for audio and the remaining battery capacity of the first electronic device for audio is greater than or equal to a threshold value.

According to various embodiments, the processor may be configured to change a master role from the electronic device for audio to the first electronic device for audio when a predetermined time elapses after identifying the first state.

According to various embodiments, the processor may be configured to change a master role from the electronic device for audio to the first electronic device for audio when a buffer level received from an external electronic device (e.g., the electronic device 201 of FIG. 2A) in which a communication link (e.g., the communication link 272 of FIG. 2A) is generated by using the communication circuit is greater than or equal to a threshold level in the first state.

According to various embodiments, the processor may be configured to identify that the first electronic device for audio is worn on a user's body.

According to various embodiments, the processor may be configured to output audio data stored to correspond to the buffer level in each of the electronic device for audio and the first electronic device for audio while changing the master role from the electronic device for audio to the first electronic device for audio.

According to various embodiments, the processor may be configured to change a master role from the electronic device for audio to the first electronic device for audio when identifying that the first electronic device for audio is worn on a user's body in the first state.

According to various embodiments, the processor may be configured to change a master role from the electronic device for audio to the first electronic device for audio when identifying that both the electronic device for audio and the first electronic device for audio are not worn on a user's body in the first state.

According to various embodiments, the processor may be configured to maintain a master role of the electronic device for audio when identifying that audio data is being transmitted to an external electronic device in which a communication link is generated by using the communication circuit in the first state.

According to various embodiments, the processor may be configured to change a master role from the electronic device for audio to the first electronic device for audio when identifying that a communication link configured between the electronic device for audio and an external electronic device is released in the first state.

According to various embodiments, the processor may be configured to change a master role from the electronic device for audio to the first electronic device for audio when identifying that the cover of a charging case device (e.g., the charging case device 290 of FIG. 2C and/or the charging case device 290 of FIG. 5) into which the electronic device for audio and the first electronic device for audio are inserted is open in the first state.

Figure 6:
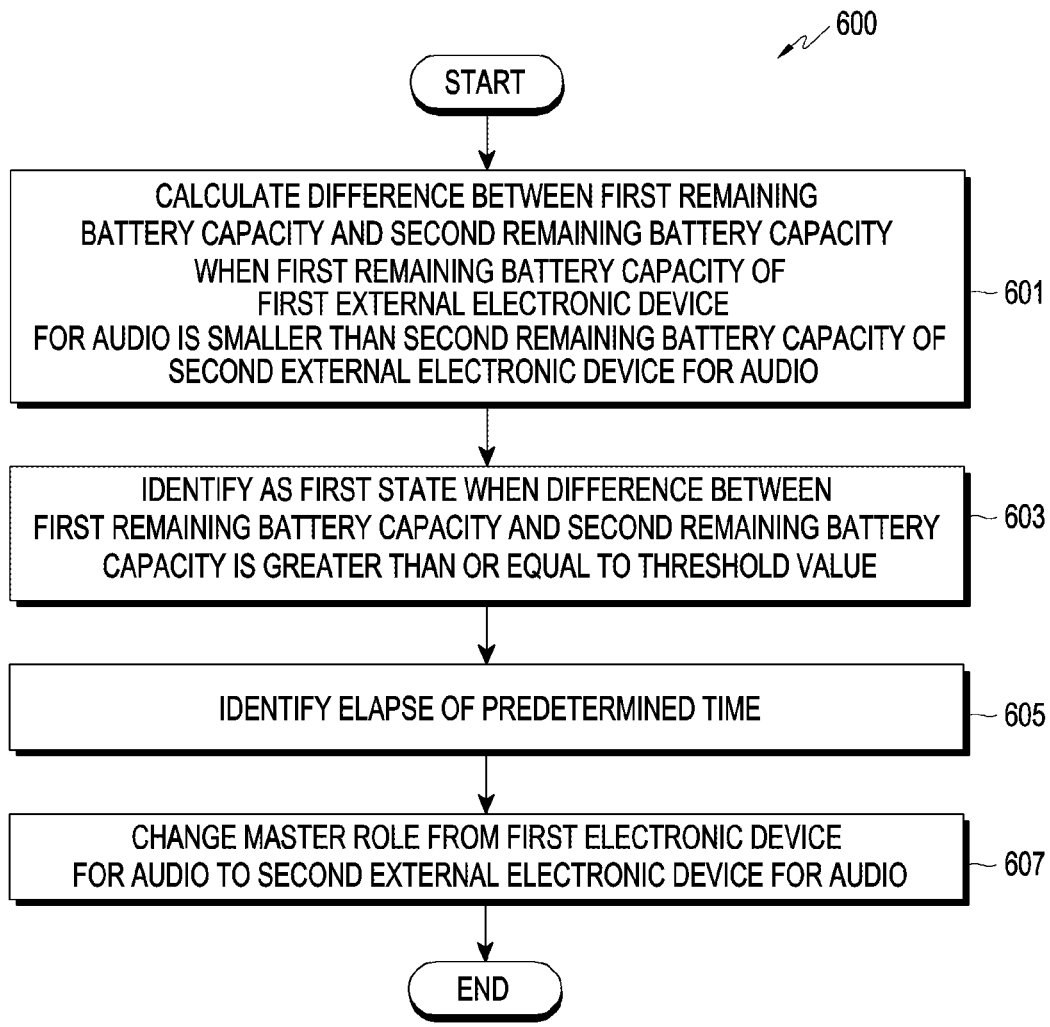
FIG. 6 is a diagram illustrating a power management operation of an electronic device for audio according to various example embodiments.

FIG. 6 is a diagram 600 illustrating a power management operation of an electronic device for audio according to various embodiments. The operations providing the power management operation may include operations 601 to 607. According to an embodiment, at least one of operations 601 to 607 may be omitted, the order of some operations may be changed, or another operation may be added.

In operation 601, the first electronic device for audio (e.g., the first electronic device for audio 251 of FIG. 2A) may calculate a difference between the first remaining battery capacity and the second remaining battery capacity when first remaining battery capacity of first external electronic device for audio is smaller than second remaining battery capacity of second external electronic device for audio (e.g., the second electronic device for audio 252 of FIG. 2A).

According to an embodiment, the first electronic device for audio may generate a communication link based on Bluetooth communication (e.g., BLE communication) with the second electronic device for audio. In a connection process for generating the communication link, the master role may be determined for the first electronic device for audio, and the slave role may be determined for the second electronic device for audio.

According to an embodiment, the first electronic device for audio may configure a communication link (e.g., the communication link 272 of FIG. 2A) with the electronic device (e.g., the electronic device 201 of FIG. 2A) based on Bluetooth communication (e.g., BLE communication and/or Bluetooth legacy communication), and may transmit and receive data to and from the electronic device through the communication link.

According to an embodiment, the first electronic device for audio may calculate a difference between the first remaining battery capacity and the second remaining battery capacity if the first remaining battery capacity is smaller than the second remaining battery capacity after comparing the first remaining battery capacity detected in the first electronic device for audio and the second remaining battery capacity received from the second electronic device for audio.

In operation 603, the first electronic device for audio (e.g., the first electronic device for audio 251 of FIG. 2A) may identify as the first state when the difference between the first remaining battery capacity and the second remaining battery capacity is greater than or equal to a threshold value.

According to an embodiment, the first electronic device for audio may identify as the first state in which the master role may be changed when the difference between the first remaining battery capacity and the second remaining battery capacity is greater than or equal to a threshold value.

In operation 605, the first electronic device for audio (e.g., the first electronic device for audio 251 of FIG. 2A) may identify the elapse of a predetermined time in the first state.

According to an embodiment, the first electronic device for audio may identify the elapse of a predetermined time in the first state to identify that the first state is maintained without being changed.

In operation 607, the first electronic device for audio (e.g., the first electronic device for audio 251 of FIG. 2A) may change the master role from the first electronic device for audio to the second electronic device for audio (e.g., the second electronic device for audio 252 of FIG. 2A).

According to an embodiment, when the predetermined time elapses in the first state, the first electronic device for audio may transfer the master role of the first electronic device for audio to the second electronic device for audio, and the first electronic device for audio may perform the slave role.

Figure 7:
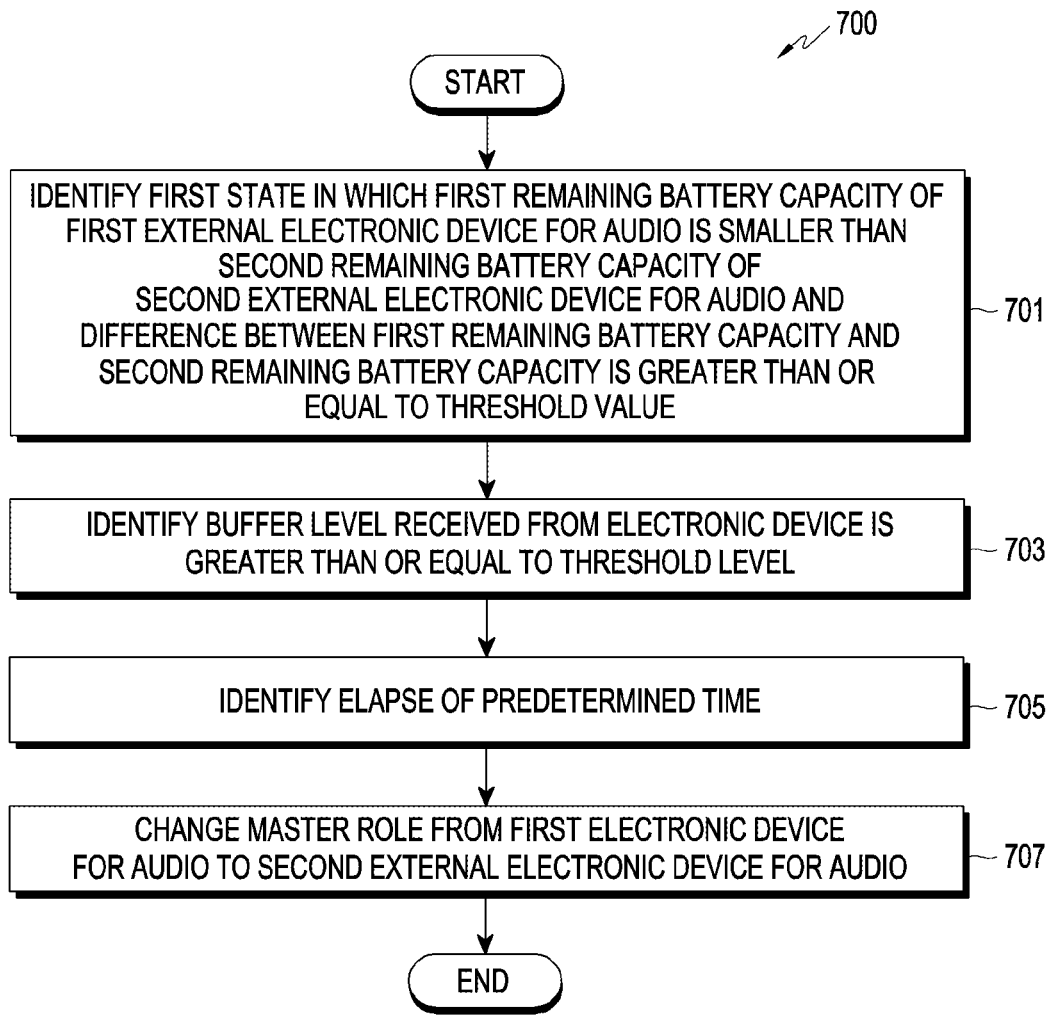
FIG. 7 is a diagram illustrating a power management operation of an electronic device for audio according to various example embodiments.

FIG. 7 is a diagram 700 illustrating a power management operation of an electronic device for audio according to various embodiments. The operations providing the power management operation may include operations 701 to 707. According to an embodiment, at least one of operations 701 to 707 may be omitted, the order of some operations may be changed, or another operation may be added.

In operation 701, the first electronic device for audio (e.g., the first electronic device for audio 251 of FIG. 2A) may identify as the first state when first remaining battery capacity of first external electronic device for audio is smaller than second remaining battery capacity of second external electronic device for audio (e.g., the second electronic device for audio 252 of FIG. 2A) and the difference between the first remaining battery capacity and the second remaining battery capacity is greater than or equal to a threshold value.

According to an embodiment, the first electronic device for audio may generate a communication link (e.g., the first communication link 271 of FIG. 2A) based on Bluetooth communication (e.g., BLE communication) with the second electronic device for audio. In a connection process for generating the communication link, the master role may be determined for the first electronic device for audio, and the slave role may be determined for the second electronic device for audio.

According to an embodiment, the first electronic device for audio may configure a communication link (e.g., the communication link 272 of FIG. 2A) with the electronic device (e.g., the electronic device 201 of FIG. 2A) based on Bluetooth communication (e.g., BLE communication and/or Bluetooth legacy communication), and may transmit and receive data to and from the electronic device through the communication link.

According to an embodiment, the first electronic device for audio may calculate a difference between the first remaining battery capacity and the second remaining battery capacity if the first remaining battery capacity is smaller than the second remaining battery capacity after comparing the first remaining battery capacity detected in the first electronic device for audio and the second remaining battery capacity received from the second electronic device for audio.

In operation 703, the first electronic device for audio (e.g., the first electronic device for audio 251 of FIG. 2A) may identify that the buffer level received from the electronic device (e.g., the electronic device 201 of FIG. 2A) in which the communication link is configured is greater than or equal to the threshold level in the first state.

According to an embodiment, the first electronic device for audio may receive information related to a buffer level corresponding to the current operating state (e.g., the type of application being executed (e.g., music-related applications)) of the electronic device, and may identify that the buffer level is greater than or equal to the threshold level in the first state.

According to an embodiment, the first electronic device for audio may transmit information related to a buffer level received from the electronic device to the second electronic device for audio (e.g., the second electronic device for audio 252 of FIG. 2A) in the first state.

According to an embodiment, the buffer level greater than or equal to the threshold level represents a buffer level sufficient to prevent or reduce interruption of output of audio data while performing the operation of changing the master role from the first electronic device for audio to the second electronic device for audio. Each of the first electronic device for audio and the second electronic device for audio may store audio data received from the electronic device to correspond to the buffer level, and then output audio data through a speaker of each of the first electronic device for audio and the second electronic device for audio.

In operation 705, the first electronic device for audio (e.g., the first electronic device for audio 251 of FIG. 2A) may identify whether a predetermined time has elapsed when it is identified that the buffer level is greater than or equal to the threshold level in the first state.

According to an embodiment, the first electronic device for audio may identify whether the predetermined time has elapsed when it is identified that the buffer level is greater than or equal to the threshold level in the first state to identify that the operation state of the electronic device corresponding to the buffer level having the threshold level or higher is maintained for a predetermined time without being changed.

In operation 707, the first electronic device for audio (e.g., the first electronic device for audio 251 of FIG. 2A) may change the master role from the first electronic device for audio to the second electronic device for audio (e.g., the second electronic device for audio 252 of FIG. 2A).

According to an embodiment, when the predetermined time elapses after identifying the buffer level is greater than or equal to the threshold level in the first state, the first electronic device for audio may transfer the master role of the first electronic device for audio to the second electronic device for audio, and the first electronic device for audio may perform the slave role.

According to an embodiment, while the communication link with the electronic device is unstable according to the operation of changing the master role from the first electronic device for audio to the second electronic device for audio, each of the first electronic device for audio and the second electronic device for audio may prevent or reduce interruption of output of audio data while outputting audio data stored corresponding to a buffer level greater than or equal to the threshold level.

Figure 8:
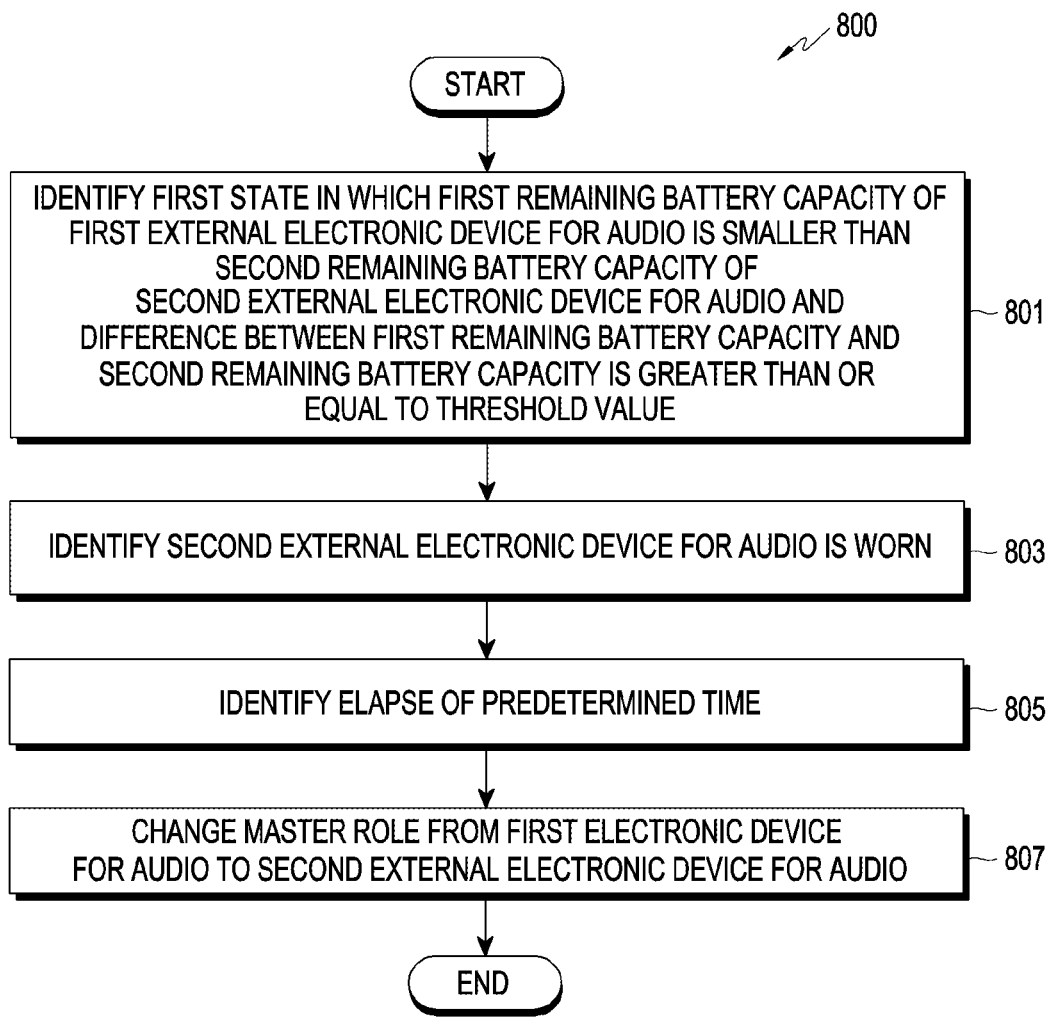
FIG. 8 is a diagram illustrating a power management operation of an electronic device for audio according to various example embodiments.

FIG. 8 is a diagram 800 illustrating a power management operation of an electronic device for audio according to various embodiments. The operations providing the power management operation may include operations 801 to 807. According to an embodiment, at least one of operations 801 to 807 may be omitted, the order of some operations may be changed, or another operation may be added.

In operation 801, the first electronic device for audio (e.g., the first electronic device for audio 251 of FIG. 2A) may identify as the first state when first remaining battery capacity of first external electronic device for audio is smaller than second remaining battery capacity of second external electronic device for audio (e.g., the second electronic device for audio 252 of FIG. 2A) and the difference between the first remaining battery capacity and the second remaining battery capacity is greater than or equal to a threshold value.

According to an embodiment, the first electronic device for audio may generate a communication link (e.g., the first communication link 271 of FIG. 2A) based on Bluetooth communication (e.g., BLE communication) with the second electronic device for audio. In a connection process for generating the communication link, the master role may be determined for the first electronic device for audio, and the slave role may be determined for the second electronic device for audio.

According to an embodiment, the first electronic device for audio may configure a communication link (e.g., the communication link 272 of FIG. 2A) with the electronic device (e.g., the electronic device 201 of FIG. 2A) based on Bluetooth communication (e.g., BLE communication and/or Bluetooth legacy communication), and may transmit and receive data to and from the electronic device through the communication link.

According to an embodiment, the first electronic device for audio may calculate a difference between the first remaining battery capacity and the second remaining battery capacity if the first remaining battery capacity is smaller than the second remaining battery capacity after comparing the first remaining battery capacity detected in the first electronic device for audio and the second remaining battery capacity received from the second electronic device for audio.

In operation 803, the first electronic device for audio (e.g., the first electronic device for audio 251 of FIG. 2A) may identify that the second electronic device for audio (e.g., the second electronic device for audio 252 of FIG. 2A) is in a worn state.

According to an embodiment, the second electronic device for audio may identify that the second electronic device for audio is worn on a user's body (e.g., an ear) through a sensor (e.g., a proximity sensor) of the second electronic device for audio, and the first electronic device for audio may identify that the second electronic device for audio is worn on the user's body (e.g., an ear) based on the wearing status information received from the second electronic device for audio.

In operation 805, the first electronic device for audio (e.g., the first electronic device for audio 251 of FIG. 2A) may identify whether a predetermined time has elapsed after identifying that the second electronic device for audio (e.g., the second electronic device for audio 252 of FIG. 2A) is in a worn state in the first state.

According to an embodiment, the first electronic device for audio may identify whether a predetermined time has elapsed when it is identified that the second electronic device for audio is in a worn state in the first state to identify that the wearing state of the second electronic device for audio is maintained for a predetermined time without being changed.

In operation 807, the first electronic device for audio (e.g., the first electronic device for audio 251 of FIG. 2A) may change the master role from the first electronic device for audio to the second electronic device for audio (e.g., the second electronic device for audio 252 of FIG. 2A).

According to an embodiment, the first electronic device for audio may change the master role leading communication with the electronic device from the first electronic device for audio to the second electronic device for audio being worn on the user's body (e.g., ears).

Figure 9:
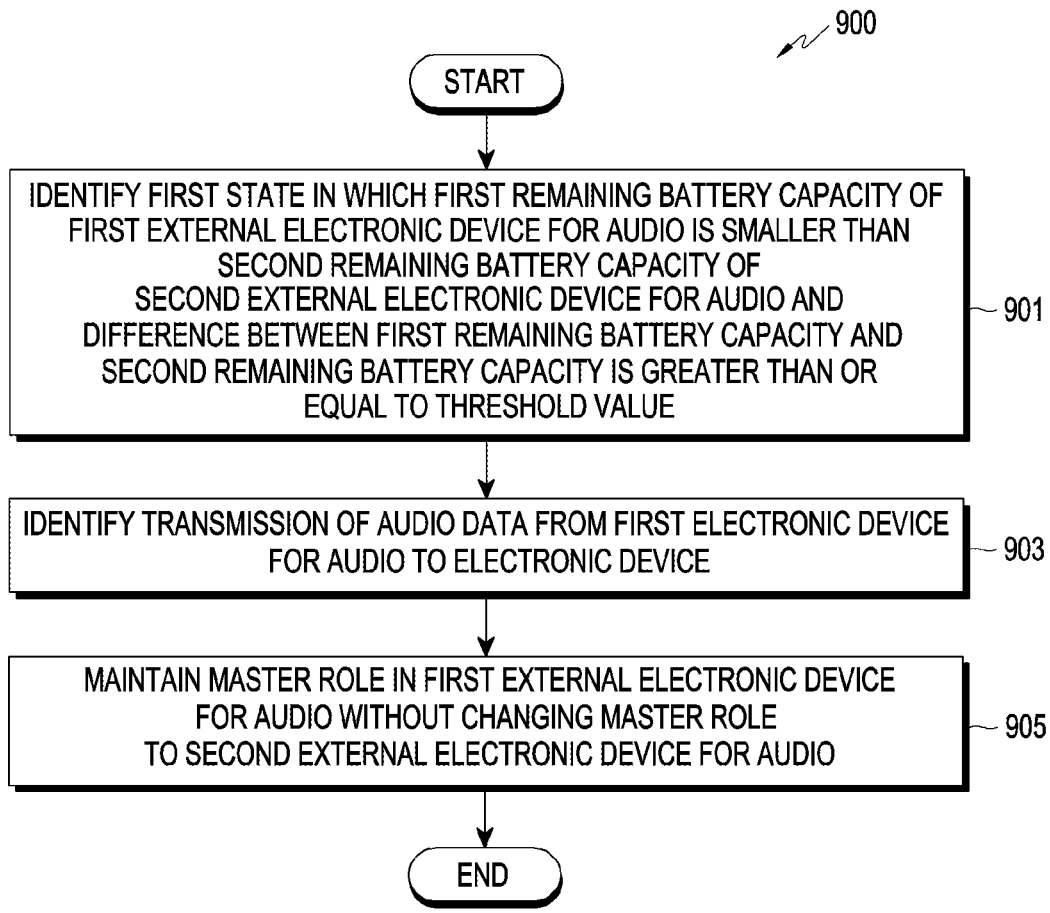
FIG. 9 is a diagram illustrating a power management operation of an electronic device for audio according to various example embodiments.

FIG. 9 is a diagram 900 illustrating a power management operation of an electronic device for audio according to various embodiments. The operations providing the power management operation may include operations 901 to 905. According to an embodiment, at least one of operations 901 to 905 may be omitted, the order of some operations may be changed, or another operation may be added.

In operation 901, the first electronic device for audio (e.g., the first electronic device for audio 251 of FIG. 2A) may identify as the first state when first remaining battery capacity of first external electronic device for audio is smaller than second remaining battery capacity of second external electronic device for audio (e.g., the second electronic device for audio 252 of FIG. 2A) and the difference between the first remaining battery capacity and the second remaining battery capacity is greater than or equal to a threshold value.

According to an embodiment, the first electronic device for audio may generate a communication link (e.g., the first communication link 271 of FIG. 2A) based on Bluetooth communication (e.g., BLE communication) with the second electronic device for audio. In a connection process for generating the communication link, the master role may be determined for the first electronic device for audio, and the slave role may be determined for the second electronic device for audio.

According to an embodiment, the first electronic device for audio may configure a communication link (e.g., the communication link 272 of FIG. 2A) with the electronic device (e.g., the electronic device 201 of FIG. 2A) based on Bluetooth communication (e.g., BLE communication and/or Bluetooth legacy communication), and may transmit and receive data to and from the electronic device through the communication link.

According to an embodiment, the first electronic device for audio may calculate a difference between the first remaining battery capacity and the second remaining battery capacity if the first remaining battery capacity is smaller than the second remaining battery capacity after comparing the first remaining battery capacity detected in the first electronic device for audio and the second remaining battery capacity received from the second electronic device for audio.

In operation 903, the first electronic device for audio (e.g., the first electronic device for audio 251 of FIG. 2A) may identify that audio data is being transmitted from the first electronic device for audio to the electronic device (e.g., the electronic device 201 of FIG. 2A) in the first state.

According to an embodiment, the first electronic device for audio may transmit audio data input through a microphone of the first electronic device for audio or a microphone of the second electronic device for audio to the electronic device as the electronic device performs an operation state (e g, making a call) using a microphone of the first electronic device for audio or a microphone of the second electronic device for audio in the first state.

In operation 905, the first electronic device for audio (e.g., the first electronic device for audio 251 of FIG. 2A) may maintain the master role in the first electronic device for audio without changing the master role to the second electronic device for audio (e.g., the electronic device 252 of FIG. 2A).

According to an embodiment, the first electronic device for audio may maintain the master role in the first electronic device for audio without changing the master role to the second electronic device for audio for stability in communication with the electronic device when the electronic device performs an operation state (e g, making a call) using a microphone of the first electronic device for audio or a microphone of the second electronic device for audio in the first state.

Figure 10:
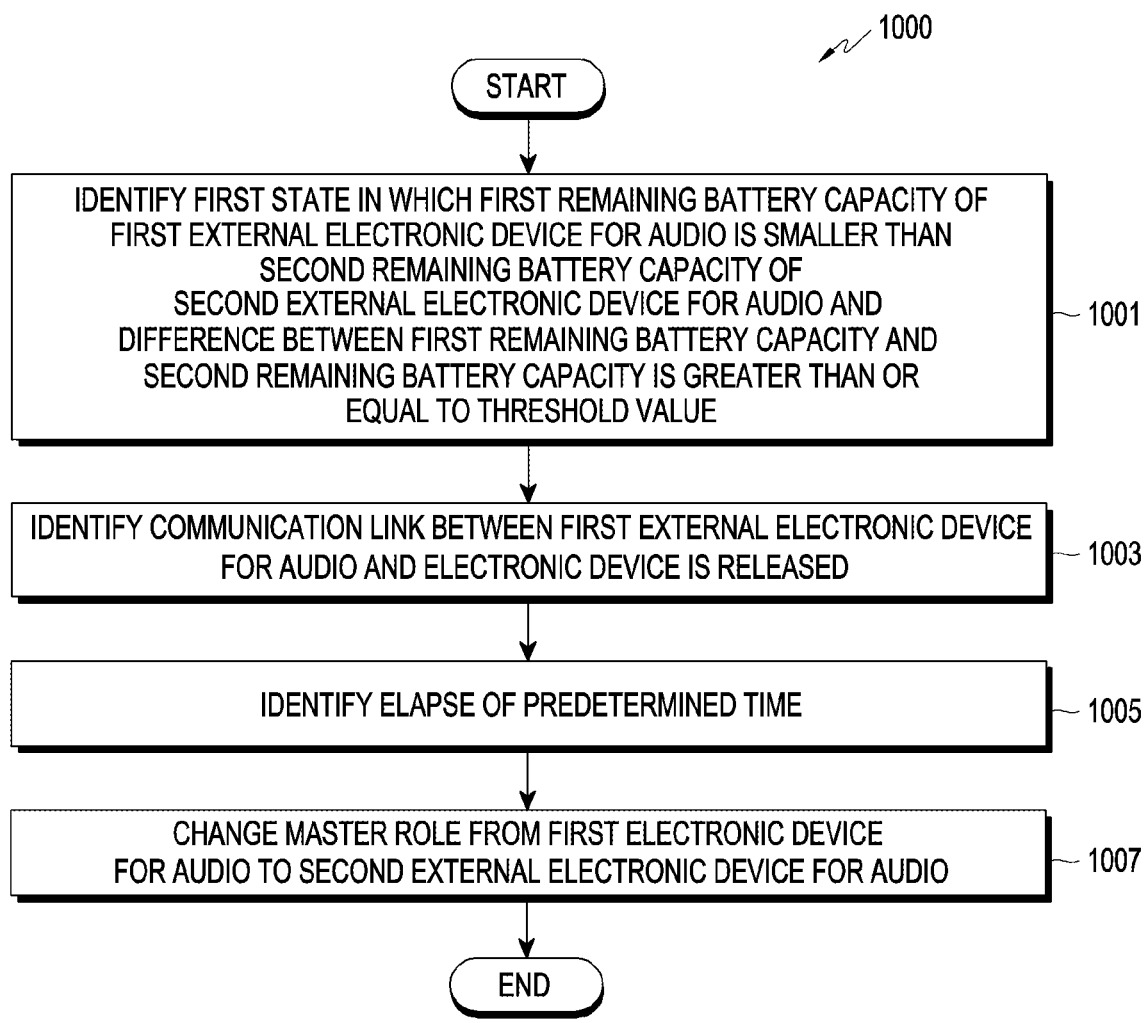
FIG. 10 is a diagram illustrating a power management operation of an electronic device for audio according to various example embodiments.

FIG. 10 is a diagram 1000 illustrating a power management operation of an electronic device for audio according to various embodiments. The operations providing the power management operation may include operations 1001 to 1007. According to an embodiment, at least one of operations 1001 to 1007 may be omitted, the order of some operations may be changed, or another operation may be added.

In operation 1001, the first electronic device for audio (e.g., the first electronic device for audio 251 of FIG. 2A) may identify as the first state when first remaining battery capacity of first electronic device for audio is smaller than second remaining battery capacity of second electronic device for audio (e.g., the second electronic device for audio 252 of FIG. 2A) and the difference between the first remaining battery capacity and the second remaining battery capacity is greater than or equal to a threshold value.

According to an embodiment, the first electronic device for audio may generate a communication link (e.g., the first communication link 271 of FIG. 2A) based on Bluetooth communication (e.g., BLE communication) with the second electronic device for audio. In a connection process for generating the communication link, the master role may be determined for the first electronic device for audio, and the slave role may be determined for the second electronic device for audio.

According to an embodiment, the first electronic device for audio may configure a communication link (e.g., the communication link 272 of FIG. 2A) with the electronic device (e.g., the electronic device 201 of FIG. 2A) based on Bluetooth communication (e.g., BLE communication and/or Bluetooth legacy communication), and may transmit and receive data to and from the electronic device through the communication link.

According to an embodiment, the first electronic device for audio may calculate a difference between the first remaining battery capacity and the second remaining battery capacity if the first remaining battery capacity is smaller than the second remaining battery capacity after comparing the first remaining battery capacity detected in the first electronic device for audio and the second remaining battery capacity received from the second electronic device for audio.

In operation 1003, the first electronic device for audio (e.g., the first electronic device for audio 251 of FIG. 2A) may identify the release of the communication link between the first electronic device for audio and the electronic device (e.g., the electronic device 201 of FIGS. 2A to 2B) in the first state.

According to an embodiment, the first electronic device for audio may identify the release of the communication link with the electronic device in a case where the first electronic device for audio is out of the communicable range with the electronic device and the connection state is deteriorated, in a case where the first electronic device for audio and the second electronic device for audio are inserted into a charging case device (e.g., the charging case device 290 of FIG. 2C), in a case where the cover of the charging case device into which the first electronic device for audio and the second electronic device for audio are inserted is closed, or in a case where the power of the first electronic device for audio and the second electronic device for audio is turned off by a user's input.

In operation 1005, the first electronic device for audio (e.g., the first electronic device for audio 251 of FIG. 2A) may identify whether a predetermined time has elapsed after identifying release of the communication link between the first electronic device for audio and the electronic device (e.g., the electronic device 201 of FIGS. 2A to 2B) in the first state.

According to an embodiment, the first electronic device for audio may identify whether a predetermined time has elapsed after identifying release of the communication link between the first electronic device for audio and the electronic device in the first state to identify that the release of the communication link between the first electronic device for audio and the electronic device is maintained for a predetermined time without being changed.

In operation 1007, the first electronic device for audio (e.g., the first electronic device for audio 251 of FIG. 2A) may change the master role from the first electronic device for audio to the second electronic device for audio (e.g., the second electronic device for audio 252 of FIG. 2A).

According to an embodiment, the first electronic device for audio may change the master role from the first electronic device for audio to the second electronic device for audio during the release of the communication link between the first electronic device for audio in which an interruption in output of audio data does not occur as audio data is not transmitted/received and the electronic device in the first state.

Figure 11:
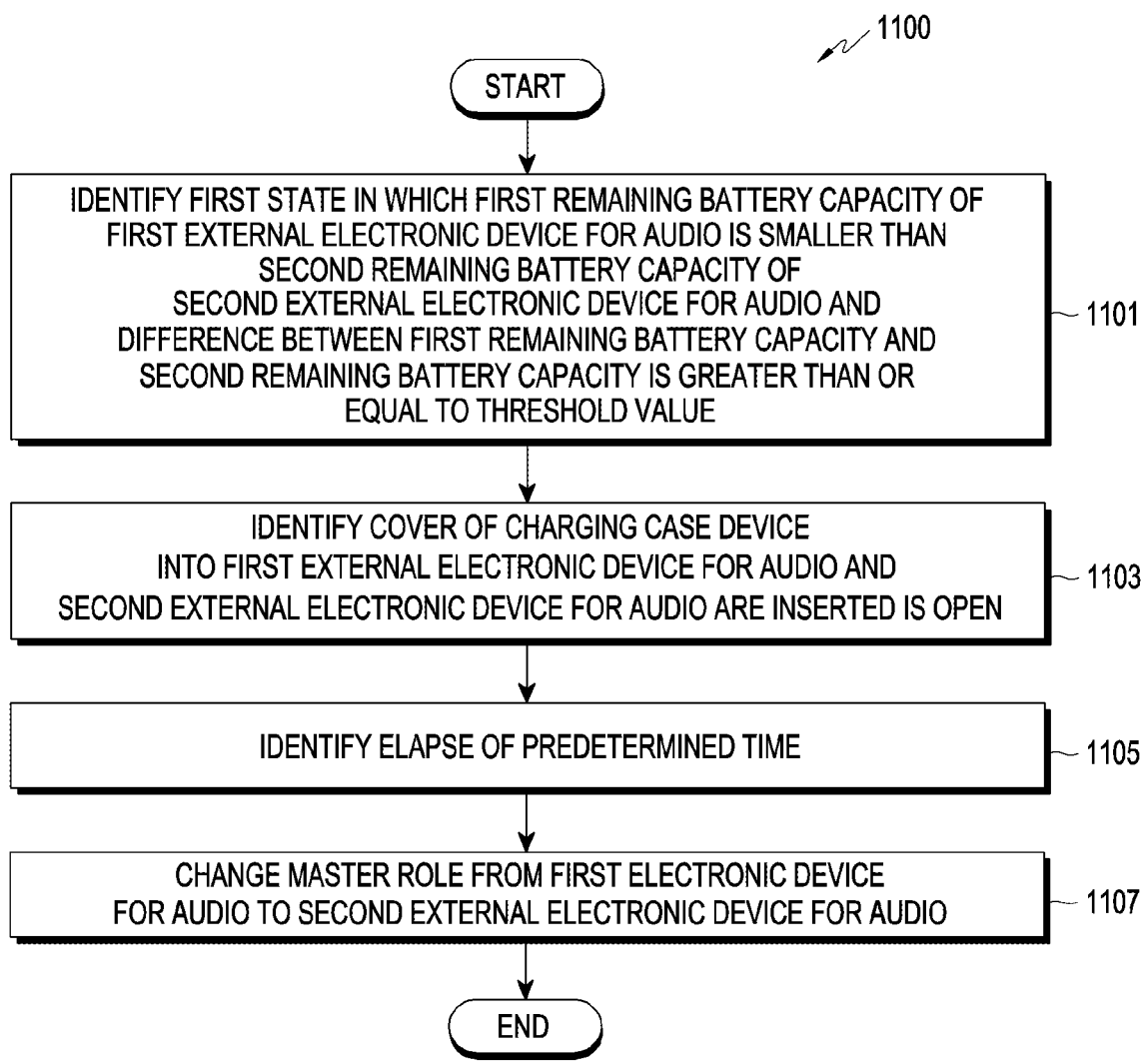
FIG. 11 is a diagram illustrating a power management operation of an electronic device for audio according to various example embodiments.

FIG. 11 is a diagram 1100 illustrating a power management operation of an electronic device for audio according to various embodiments. The operations providing the power management operation may include operations 1101 to 1107. According to an embodiment, at least one of operations 1101 to 1107 may be omitted, the order of some operations may be changed, or another operation may be added.

In operation 1101, the first electronic device for audio (e.g., the first electronic device for audio 251 of FIG. 2A) may identify as the first state when the first remaining battery capacity of the first electronic device for audio is smaller than the second remaining battery capacity of the second electronic device for audio (e.g., the second electronic device for audio 252 of FIG. 2A) and the difference between the first remaining battery capacity and the second remaining battery capacity is greater than or equal to a threshold value.

According to an embodiment, the first electronic device for audio may generate a communication link (e.g., the first communication link 271 of FIG. 2A) based on Bluetooth communication (e.g., BLE communication) with the second electronic device for audio. In a connection process for generating the communication link, the master role may be determined for the first electronic device for audio, and the slave role may be determined for the second electronic device for audio.

According to an embodiment, the first electronic device for audio may calculate a difference between the first remaining battery capacity and the second remaining battery capacity if the first remaining battery capacity is smaller than the second remaining battery capacity after comparing the first remaining battery capacity detected in the first electronic device for audio and the second remaining battery capacity received from the second electronic device for audio.

In operation 1103, the first electronic device for audio (e.g., the first electronic device for audio 251 of FIG. 2A) may identify that the cover of the charging case device (e.g., the charging case device 290 of FIG. 2C) into the first electronic device for audio and the second electronic device for audio (e.g., the second electronic device for audio 252 of FIG. 2A) are inserted is open in the first state.

According to an embodiment, the first electronic device for audio may be inserted and stored in the charging case device for charging and/or storage, and may switch to a standby state for generating a communication link when the cover of the charging case device is confirmed to be in an open state based on the cover open/close information of the charging case device received from the charging case device.

In operation 1105, the first electronic device for audio (e.g., the first electronic device for audio 251 of FIG. 2A) may identify the elapse of a predetermined time after identifying that the cover of the charging case device (e.g., the charging case device 290 of FIG. 2C) into the first electronic device for audio and the second electronic device for audio (e.g., the second electronic device for audio 252 of FIG. 2A) are inserted is open in the first state.

According to an embodiment, the first electronic device for audio may identify whether a predetermined time has elapsed after identifying that the cover of the charging case device into the first electronic device for audio and the second electronic device for audio are inserted is open to identify that a standby state in which the cover of the charging case device into the first electronic device for audio and the second electronic device for audio are inserted is open is maintained for a predetermined time without being changed.

In operation 1107, the first electronic device for audio (e.g., the first electronic device for audio 251 of FIG. 2A) may change the master role from the first electronic device for audio to the second electronic device for audio (e.g., the second electronic device for audio 252 of FIG. 2A).

According to an embodiment, the first electronic device for audio may change the master role from the first electronic device for audio to the second electronic device for audio because the first electronic device for audio in the current master role may consume a lot of power by searching for peripheral devices to generate a communication link with the electronic device when the cover of the charging case device into the first electronic device for audio and the second electronic device for audio are inserted is open in the first state.

According to an embodiment, the first electronic device for audio may change the master role from the first electronic device for audio to the second electronic device for audio in operation 1107 when it is identified that the first state in which the first remaining battery capacity of the first electronic device for audio is smaller than the second remaining battery capacity of the second electronic device for audio and the difference between the first remaining battery capacity and the second remaining battery capacity is greater than or equal to a threshold value in operation 1101 after identifying that the cover of the charging case device (e.g., the charging case device 290 of FIG. 2C) into the first electronic device for audio and the second electronic device for audio (e.g., the second electronic device for audio 252 of FIG. 2A) are inserted is open in operation 1103.

According to various embodiments, a power management method for an electronic device for audio (e.g., the first electronic device for audio 251 of FIG. 2A) may include generating a communication link (e.g., the first communication link 271 of FIG. 2A) with a first electronic device for audio (e.g., the second electronic device for audio 252 of FIG. 2A) by using the communication circuit (e.g., the communication module 310 of FIG. 3, preferably including communication circuitry), calculating a difference between a remaining battery capacity of the electronic device for audio and a remaining battery capacity of the first electronic device for audio when the remaining battery capacity of the electronic device for audio is smaller than the remaining battery capacity of the first electronic device for audio, and changing a master role from the electronic device for audio to the first electronic device for audio when identifying a first state in which a difference between the remaining battery capacity of the electronic device for audio and the remaining battery capacity of the first electronic device for audio is greater than or equal to a threshold value.

According to various embodiments, the changing may include changing a master role from the electronic device for audio to the first electronic device for audio when a predetermined time elapses in the first state.

According to various embodiments, the changing may include comparing a buffer level received from an external electronic device in which a communication link is generated by using the communication circuit with a threshold level, and changing a master role from the electronic device for audio to the first electronic device for audio when the buffer level received from the external electronic device is greater than or equal to the threshold level.

According to various embodiments, identifying that the first electronic device for audio is worn on a user's body may be further included.

According to various embodiments, the changing to the first electronic device for audio may include outputting audio data stored to correspond to the buffer level in each of the electronic device for audio and the first electronic device for audio while changing the master role from the electronic device for audio to the first electronic device for audio.

According to various embodiments, the changing may include identifying wearing state of the first electronic device for audio in the first state, and changing a master role from the electronic device for audio to the first electronic device for audio when identifying that the first electronic device for audio is worn on a user's body.

According to various embodiments, the changing may include identifying wearing state of the electronic device for audio and the first electronic device for audio in the first state, and changing a master role from the electronic device for audio to the first electronic device for audio when identifying that both the electronic device for audio and the first electronic device for audio are not worn on a user's body.

According to various embodiments, identifying whether audio data is transmitted to an external electronic device in which a communication link (e.g., the communication link 272 of FIG. 2A) is generated by using the communication circuit in the first state, and maintaining a master role of the electronic device for audio when identifying that audio data is being transmitted to the external electronic device may be further included.

According to various embodiments, the changing may include identifying whether a communication link configured between the electronic device for audio and an external electronic device is released, and changing a master role from the electronic device for audio to the first electronic device for audio when identifying that the communication link configured between the electronic device for audio and the external electronic device is released.

According to various embodiments, the changing may include identifying whether the electronic device for audio and the first electronic device for audio are inserted in a charging case device in the first state, identifying a state of the cover of the charging case device when identifying the electronic device for audio and the first electronic device for audio are inserted in the charging case device, and changing a master role from the electronic device for audio to the first electronic device for audio when identifying that the cover of the charging case device into which the electronic device for audio and the first electronic device for audio are inserted is open. Each embodiment herein may be used in combination with any other embodiment herein.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-volatile storage medium storing instructions which, when executed, cause an electronic device comprising at least one processor to perform at least one operation, the at least one operation may include generating a communication link with a first electronic device for audio by using the communication circuit, calculating a difference between a remaining battery capacity of the electronic device for audio and a remaining battery capacity of the first electronic device for audio when the remaining battery capacity of the electronic device for audio is smaller than the remaining battery capacity of the first electronic device for audio, and changing a master role from the electronic device for audio to the first electronic device for audio when identifying a first state in which a difference between the remaining battery capacity of the electronic device for audio and the remaining battery capacity of the first electronic device for audio is greater than or equal to a threshold value. In addition, the embodiments of the disclosure in the specification and drawings are merely provided for specific examples to easily explain the technical contents according to the embodiments of the disclosure and to help the understanding of the embodiments of the disclosure, and are not intended to limit the scope of the embodiment of the disclosure. Accordingly, the scope of various embodiments of the disclosure should be interpreted that all changes or modifications derived based on the technical idea of various embodiments of the disclosure are included in the scope of various embodiments of the disclosure in addition to the embodiments disclosed here.

What is claimed is:

1. A first earpiece device, comprising:
 a communication circuit;
 a processor configured to be operatively connected to the communication circuit; and
 memory storing instructions that, when executed by the processor, cause the first earpiece device to: generate a first communication link with a second earpiece device via the communication circuit;
 store first audio data obtained from an external electronic device via the communication circuit in a buffer;
 change a master role from the first earpiece device to the second earpiece device based at least on identifying a buffer level corresponding to the first audio data to be output via the first earpiece device, identifying a remaining battery capacity of the first earpiece device being smaller than a remaining battery capacity of the second earpiece device, a difference between the remaining battery capacity of the first earpiece device and the remaining battery capacity of the second earpiece device being greater than or equal to a threshold value, and identifying that a cover of a charging case device into which the first earpiece device and the second earpiece device are inserted is open when the remaining battery capacity of the first earpiece device is smaller than the remaining battery capacity of the second earpiece device.

2. The first earpiece device of claim 1, wherein the instructions, when executed by the processor, cause the first earpiece device to:
 change the master role from the first earpiece device to the second earpiece device when a predetermined time elapses after identifying the remaining battery capacity of the first earpiece device being smaller than the remaining battery capacity of the second earpiece device.

3. The first earpiece device of claim 1, wherein the instructions, when executed by the processor, cause the first earpiece device to:
 identify that the second earpiece device is worn on a user's body when the remaining battery capacity of the first earpiece device is smaller than the remaining battery capacity of the second earpiece device;
 change the master role from the first earpiece device to the second earpiece device when the buffer level is greater than or equal to a threshold level; and
 control to output the first audio data stored to correspond to the buffer level in each of the first earpiece device and the second earpiece device while changing the master role from first earpiece device to the second earpiece device.

4. The first earpiece device of claim 1, wherein the instructions, when executed by the processor, cause the first earpiece device to:
 change the master role from the first earpiece device to the second earpiece device based at least on identifying that the second earpiece device is worn on a user's body when the remaining battery capacity of the first earpiece device is smaller than the remaining battery capacity of the second earpiece device.

5. The first earpiece device of claim 1, wherein the instructions, when executed by the processor, cause the first earpiece device to:
 change the master role from the first earpiece device to the second earpiece device based at least on identifying that both the first earpiece device and the second earpiece device are not worn on a user's body when the remaining battery capacity of the first earpiece device is smaller than the remaining battery capacity of the second earpiece device.

6. The first earpiece device of claim 1, wherein the instructions, when executed by the processor, cause the first earpiece device to:
 generate a second communication link with the external electronic device via the communication circuit when the first earpiece device is in the master role.

7. The first earpiece device of claim 1, wherein the instructions, when executed by the processor, cause the first earpiece device to:
 change the master role from the first earpiece device to the second earpiece device based at least on identifying that a second communication link configured between the first earpiece device and the external electronic device is released when the remaining battery capacity of the first earpiece device is smaller than the remaining battery capacity of the second earpiece device.

8. A power management method for a first earpiece device, the method comprising:
 generating a first communication link with a second earpiece device via a communication circuit;
 storing first audio data obtained from an external electronic device via the communication circuit in a buffer, and
 changing a master role from the first earpiece device to the second earpiece device based at least on identifying a buffer level corresponding to the first audio data to be output via the first earpiece device, identifying a remaining battery capacity of the first earpiece device being smaller than a remaining battery capacity of the second earpiece device, a difference between the remaining battery capacity of the first earpiece device and the remaining battery capacity of the second earpiece device being greater than or equal to a threshold value, and identifying that a cover of a charging case device into which the first earpiece device and the second earpiece device are inserted is open when the remaining battery capacity of the first earpiece device is smaller than the remaining battery capacity of the second earpiece device.

9. The method of claim 8, further comprising:
 identifying that the second earpiece device is worn on a user's body when the remaining battery capacity of the first earpiece device is smaller than the remaining battery capacity of the second earpiece device;
 comparing the buffer level with a threshold level;

changing the master role from the first earpiece device to the second earpiece device based at least on the buffer level being greater than or equal to the threshold level, and controlling to output the first audio data stored to correspond to the buffer level in each of the first earpiece device and the second earpiece device while changing the master role from first earpiece device to the second earpiece device.

10. The method of claim 8, further comprising:

identifying wearing state of the second earpiece device when the remaining battery capacity of the first earpiece device is smaller than the remaining battery capacity of the second earpiece device; and changing the master role from the first earpiece device to the second earpiece device based at least on identifying that the second earpiece device is worn on a user's body.

11. The method of claim 8, further comprising:

identifying wearing state of the first earpiece device and the second earpiece device when the remaining battery capacity of the first earpiece device is smaller than the remaining battery capacity of the second earpiece device; and changing the master role from the first earpiece device to the second earpiece device based at least on identifying that both the first earpiece device and the second earpiece device are not worn on a user's body.

12. The method of claim 8, further comprising:

generating a second communication link with the external electronic device via the communication circuit when the first earpiece device is in the master role.

13. The method of claim 8, further comprising:

identifying whether a second communication link configured between the first earpiece device and the external electronic device is released; and changing the master role from the first earpiece device to the second earpiece device based at least on identifying that the second communication link configured between the first earpiece device and the external electronic device is released.

* * * * *